(12) United States Patent
Afsari et al.

(10) Patent No.: US 10,353,663 B2
(45) Date of Patent: Jul. 16, 2019

(54) MULTIMEDIA CONFERENCING

(71) Applicant: Village Experts, Inc., Burlingame, CA (US)

(72) Inventors: Farook Afsari, Menlo Park, CA (US); Altanai Bisht, Uttrakhand (IN); Pirooz Parvarandeh, Los Altos Hills, CA (US); Satish Dhote, Kolkata (IN)

(73) Assignee: Village Experts, Inc., Burlingame, CA (US)

( * ) Notice: Subject to any disclaimer, the term of this patent is extended or adjusted under 35 U.S.C. 154(b) by 158 days.

(21) Appl. No.: 15/479,070

(22) Filed: Apr. 4, 2017

(65) Prior Publication Data

US 2018/0284957 A1  Oct. 4, 2018

(51) Int. Cl.
*G06F 3/048* (2013.01)
*G06F 3/14* (2006.01)
*H04L 29/06* (2006.01)
*H04L 29/08* (2006.01)

(52) U.S. Cl.
CPC .......... *G06F 3/1454* (2013.01); *H04L 65/403* (2013.01); *H04L 67/06* (2013.01)

(58) Field of Classification Search
CPC ............... H04L 65/403; H04L 12/1822; H04L 12/1827; H04L 12/1813; H04L 12/1818; H04L 65/4015; G06F 3/1454
See application file for complete search history.

(56) References Cited

U.S. PATENT DOCUMENTS

| | | | |
|---|---|---|---|
| 9,009,741 B2 | 4/2015 | Li et al. | |
| 9,716,861 B1* | 7/2017 | Poel | .......... H04N 7/15 |
| 2004/0064510 A1* | 4/2004 | Ooi | ...... H04L 12/1822 709/205 |
| 2004/0153510 A1* | 8/2004 | Riddle | ..... G06F 9/542 709/205 |
| 2005/0232164 A1 | 10/2005 | Anzarouth et al. | |
| 2008/0097815 A1 | 4/2008 | Koretz et al. | |
| 2008/0189366 A1* | 8/2008 | Cox | ........ H04L 51/04 709/204 |
| 2009/0234721 A1* | 9/2009 | Bigelow | ..... G06Q 10/10 705/12 |
| 2012/0179502 A1* | 7/2012 | Farooq | ..... G06Q 10/06311 705/7.13 |
| 2012/0278738 A1* | 11/2012 | Kruse | ..... G06Q 10/10 715/754 |
| 2013/0061155 A1* | 3/2013 | Hon | ......... G06F 16/44 715/753 |

(Continued)

*Primary Examiner* — Justin S Lee
(74) *Attorney, Agent, or Firm* — Squire Patton Boggs (US) LLP

(57) ABSTRACT

A multimedia method comprises establishing a peer connection and data channel between a local browser running on a local user device and a remote browser running on a remote user device, performing a series of remote object handling cycles, and performing a series of local object handling cycles. The local user device includes a display screen showing a conference webpage according to the local browser, the conference webpage including an object viewing window and an object tracking window. The remote object handling cycles deal with remote file objects, such as text documents and images, received from the remote user device. The local object handling cycles deal with local file objects, such as other text documents and images, sent to the remote user device.

20 Claims, 20 Drawing Sheets

(56) References Cited

U.S. PATENT DOCUMENTS

| | | | |
|---|---|---|---|
| 2014/0095724 A1 | 4/2014 | Yoakum et al. | |
| 2014/0126715 A1 | 5/2014 | Lum et al. | |
| 2014/0181676 A1 | 6/2014 | Samborskyy et al. | |
| 2014/0211933 A1 | 7/2014 | Vymenets et al. | |
| 2014/0379823 A1 | 12/2014 | Wilsher et al. | |
| 2015/0026473 A1 | 1/2015 | Johnston et al. | |
| 2015/0134600 A1 | 5/2015 | Eisner et al. | |
| 2015/0188956 A1 | 7/2015 | Chauhan et al. | |
| 2015/0200979 A1* | 7/2015 | Huang | G06F 3/0483 715/753 |
| 2015/0269229 A1 | 9/2015 | Shenoy et al. | |
| 2016/0227161 A1 | 8/2016 | Jing et al. | |
| 2016/0266730 A1 | 9/2016 | Franke et al. | |
| 2016/0373693 A1 | 12/2016 | Segal et al. | |
| 2017/0024100 A1* | 1/2017 | Pieper | G06F 3/0486 |
| 2018/0011627 A1* | 1/2018 | Siracusano, Jr. | H04L 65/4015 |
| 2018/0027070 A1* | 1/2018 | Jhanji | H04W 4/08 709/217 |

\* cited by examiner

MULTIMEDIA CONFERENCING

FIELD

This disclosure relates generally to multimedia conferencing sessions.

BACKGROUND

In-person, face-to-face meetings often involve exchange of information in various forms and activity in such meetings can be very dynamic with participants potentially referring to different items at the same time. Participants of the meeting can share their files, discuss content with interactive gestures and voice tones, take their own notes, and keep a copy of documents shared. Existing conferencing systems have difficulty in simulating in-person meetings. There is a growing need to for a conferencing method via a communications network that simulates this and other types of dynamic activity among meeting participants.

Online conferencing often involves the participants logging into a web site hosted by a third-party web server. Sharing of a document usually passes via a centralized server and involves one participant uploading the document to the web file server/storage container, which then distributes the document to other participants. The use of the third-party web server to share documents may be undesirable due to concerns related to privacy, conservation of server-side resources, etc. There is also a continuing need for a conferencing method and system that addresses these and other concerns.

SUMMARY

Briefly and in general terms, the present invention is directed to a multimedia conferencing method.

In aspects, a method comprises establishing a peer connection between a local browser running on a local user device and a remote browser running on a remote user device, performing a series of remote object handling cycles, and performing a series of local object handling cycles. The local user device includes a display screen showing a conference webpage according to the local browser, the conference webpage including a local object viewing window, a local object tracking window, a remote object viewing window, and a remote object tracking window.

Each remote object handling cycle includes receiving a remote file object via the peer connection from the remote user device to the local user device, displaying contents of the remote file object within the remote object viewing window by replacing contents of a prior-received remote file object displayed in the remote object viewing window, and adding a name of the remote file object in time sequential order to a cumulative list, which includes a name of the prior-received remote file object, displayed within the remote object tracking window.

Each local object handling cycle includes sending a local file object via the peer connection from the local user device to the remote user device, the sending performed in response to user input on the conference webpage shown on the display screen of the local user device, displaying contents of the local file object within the local object viewing window by replacing contents of a prior-sent local file object displayed in the local object viewing window, and adding a name of the local file object in time sequential order to a cumulative list, which includes a name of the prior-sent local file object, displayed within the local object tracking window.

The features and advantages of the invention will be more readily understood from the following detailed description which should be read in conjunction with the accompanying drawings.

DETAILED DESCRIPTION

Figure 1:
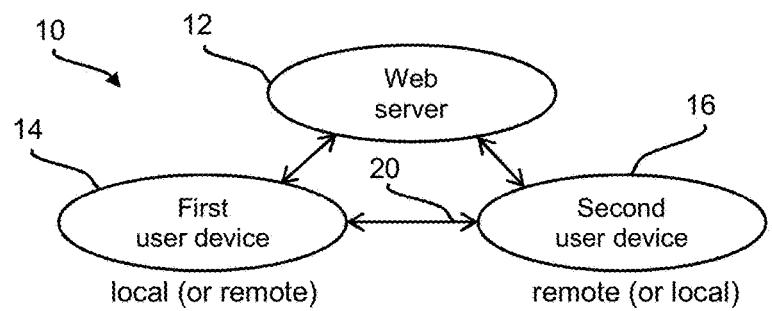
FIG. 1 is a schematic block diagram of an example system for multi-media conferencing.

Referring now in more detail to the example drawings for purposes of illustrating aspects of the invention, wherein like reference numerals designate corresponding or like elements among the several views, there is shown in FIG. 1 example conferencing system 10 which includes web server 12, first user device 14, and second user device 16. Communication between the server and the user devices occurs via a secure network connection such as a Hypertext Transfer Protocol Secure (HTTPS) connection and a Secure WebSockets connection.

User devices 14 and 16 may be any type of computing device having a display and network communication functions, such as a desktop computer, laptop computer, tablet computer, smartphone, cable TV boxes, and gaming consoles, as non-limiting examples. Each user device has a camera and a microphone (162 and 164 in FIG. 21) which may be built-in to the user device or may be peripheral accessories connected to the user device. Each user device runs a web browser application, such as Google Chrome™, Mozilla Firefox®, Microsoft Internet Explorer®, as non-limiting examples, for communicating with other user devices and web server 12. As used herein, the term "browser" (174 in FIG. 21) refers to the software application that includes the web browser application and additional code (such as HTML, WebRTC-enabled applications, plug-ins, JavaScript, applets, and extensions as non-limiting examples) utilized by the web browser application and that may be provided to it by any one or more of: web server 12, signaling server (13 in FIG. 3), and other computer servers.

Figure 2:
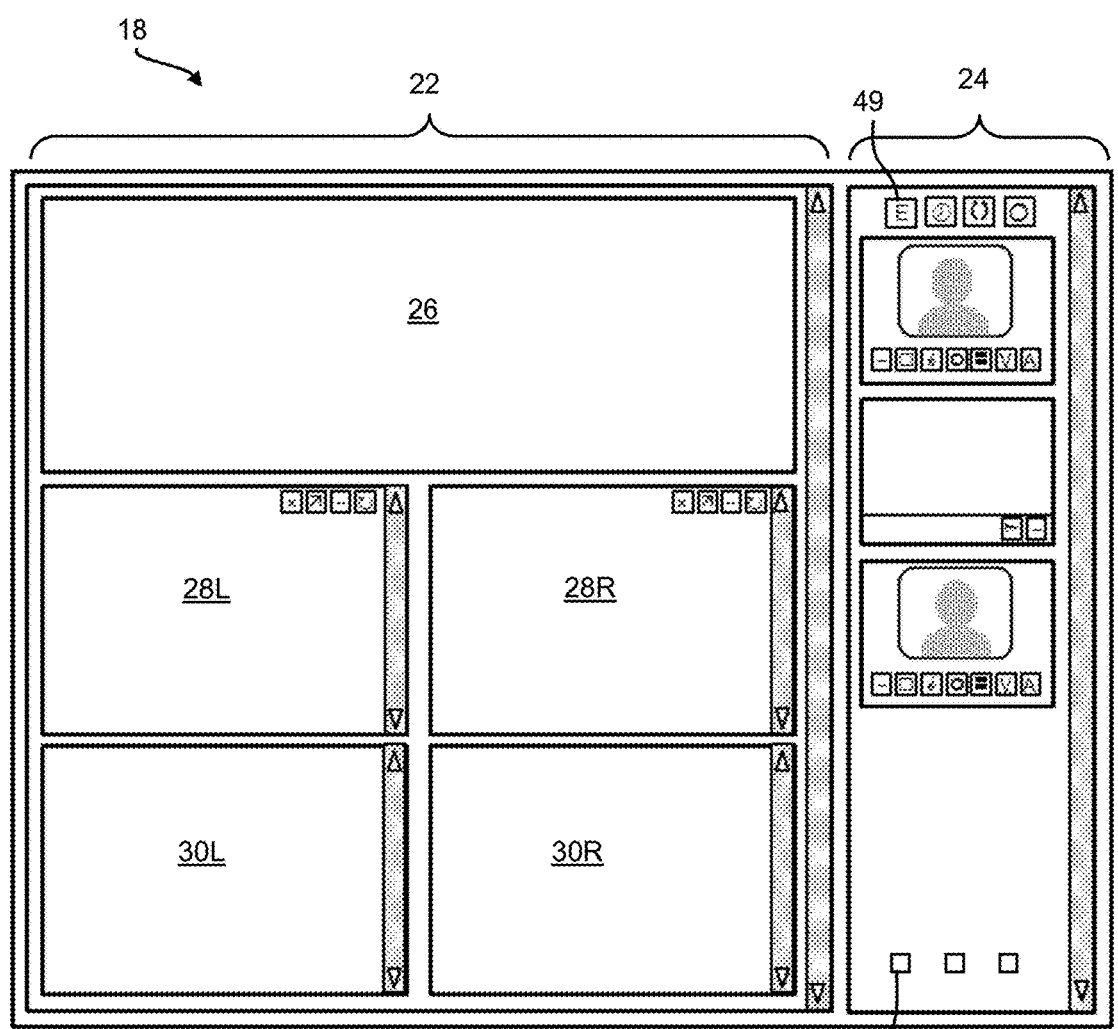
FIG. 2 is a schematic diagram of an example conference webpage.

FIG. 2 shows example conference webpage 18 which is displayed by the browser on the display screen (166 in FIG. 21) of first user device 14 and second user device 16. First user device 14 and second user device 16 obtain conference webpage 18 from web server 12. After conference webpage 18 is obtained, first user device 14 and second user device 16 communicate via peer connection 20 with one another. Conference webpage 18 includes work space 22 and communication space 24. Work space 22 serves as a virtual conference table where documents (such as PDF and Microsoft Word, Excel®, PowerPoint®), text and bytecode files, as non-limiting examples), digital photographs, and other objects are displayed and sequentially listed during the course of the conference session. Communication space 24 is where real-time video of the users (conference participants) are displayed.

The descriptions below will use the terms "local" and "remote" to refer to the conference webpage. It is to be understood that both local and remote conference webpages can have the same graphics windows as shown in FIG. 2.

Each user device has communication hardware (170 in FIG. 21) that allows the user device to receive and transmit various PDF documents, digital photographs, and other objects from and to the other user device via the peer connection. Each user device receives and transmits real-time video of the users from and to the other user device via the peer connection. The video data includes image and audio data, which are generated using the cameras and microphones on the user devices.

The peer connection between first user device 14 and second user device 16 may be a WebRTC session with real-time video, audio, and data exchange. WebRTC refers to Web Real-Time Communications. Industry standards for WebRTC are under joint development by the World Wide Web Consortium and the Internet Engineering Task Force. For example and without limitation, the WebRTC session can be established as described in U.S. Patent Application Publication No. 2014/0095724, which is incorporated herein by reference.

A WebRTC session can be established by the browsers of first user device 14 and second user device 16 obtaining a WebRTC-enabled web application, such as HTML5/JavaScript web applications, from web server 12. Thereafter, the browsers on the user devices engage in a session description protocol (SDP) exchange, also referred to as an offer/answer exchange, to communicate and reach an agreement on parameters that define characteristics of the conference session.

Figure 3:
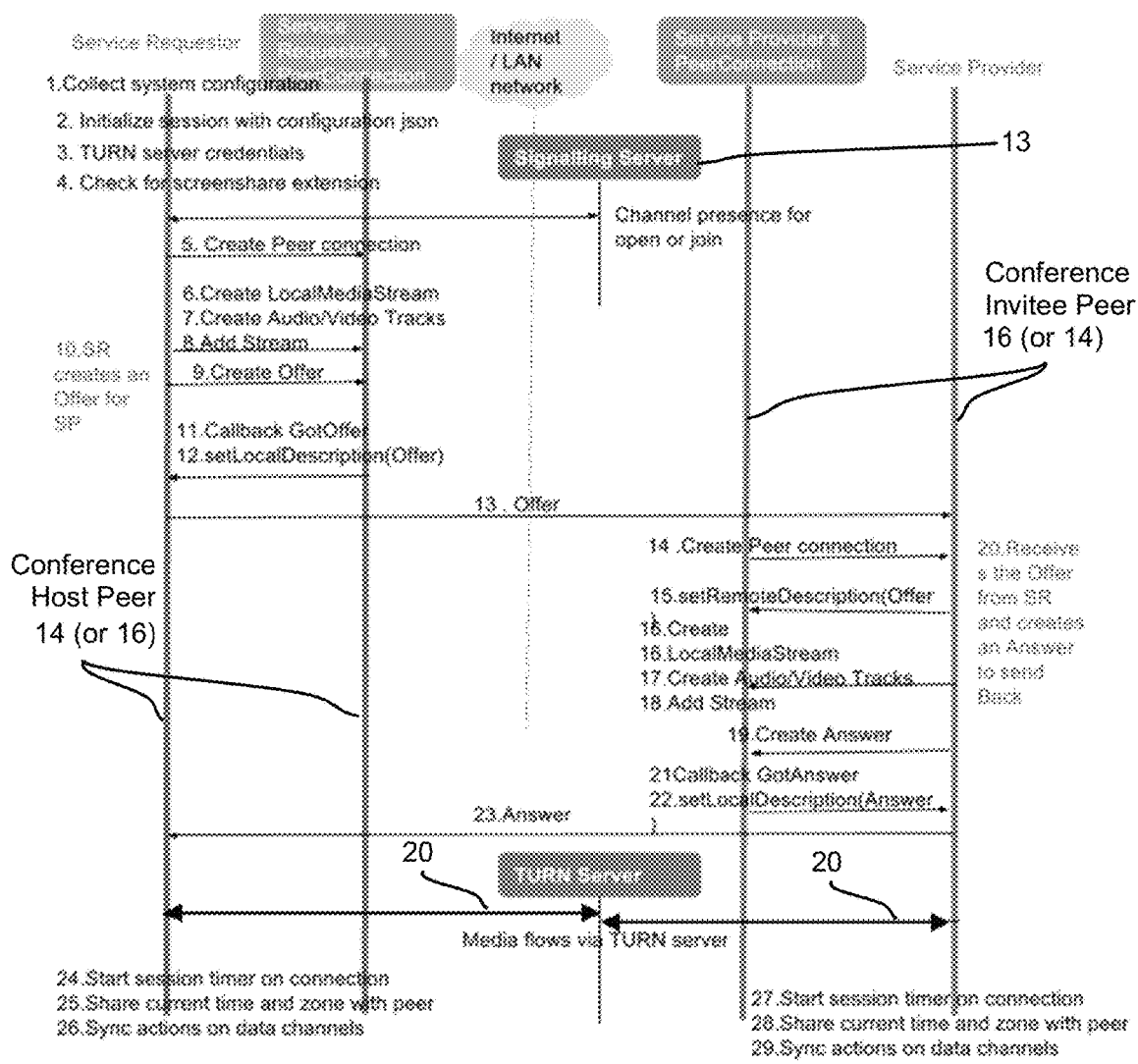
FIG. 3 is a process diagram of a WebRTC offer/answer exchange.

FIG. 3 shows an example offer/answer exchange between first user device 14 and second user device 16. A conference session is setup by a user at one of the user devices (a conference host peer), who invites the user (conference invitee peer) at the other user device to the conference session. Signaling server 13 processes the call control logic and approves the connection between the two peers.

The browser (also referred to as a first browser) of first user device 14 sends an offer to the browser (also referred to as a second browser) of second user device 16. The offer includes a WebRTC session description object that specifies media types and capabilities that the first browser supports and prefers for use in the WebRTC session. The second browser responds with a WebRTC session description object answer that indicates which of the offered media types and capabilities are supported and acceptable for the WebRTC session. Thereafter, the first and second browsers establish a direct peer connection with each other. The peer connection may employ the Secure Real-time Transport Protocol (SRTP) and/or other protocols to transport media objects and other data in real-time. Optionally, the peer connection may go through a TURN server to assist in traversal of network address translators (NAT) or firewalls. As known in the art, TURN is an acronym for Traversal Using Relays around Network Address Translation. The peer connection is made without the use of any RTP proxy except, optionally, for the purpose of a TURN server which provides NAT.

Figure 4:
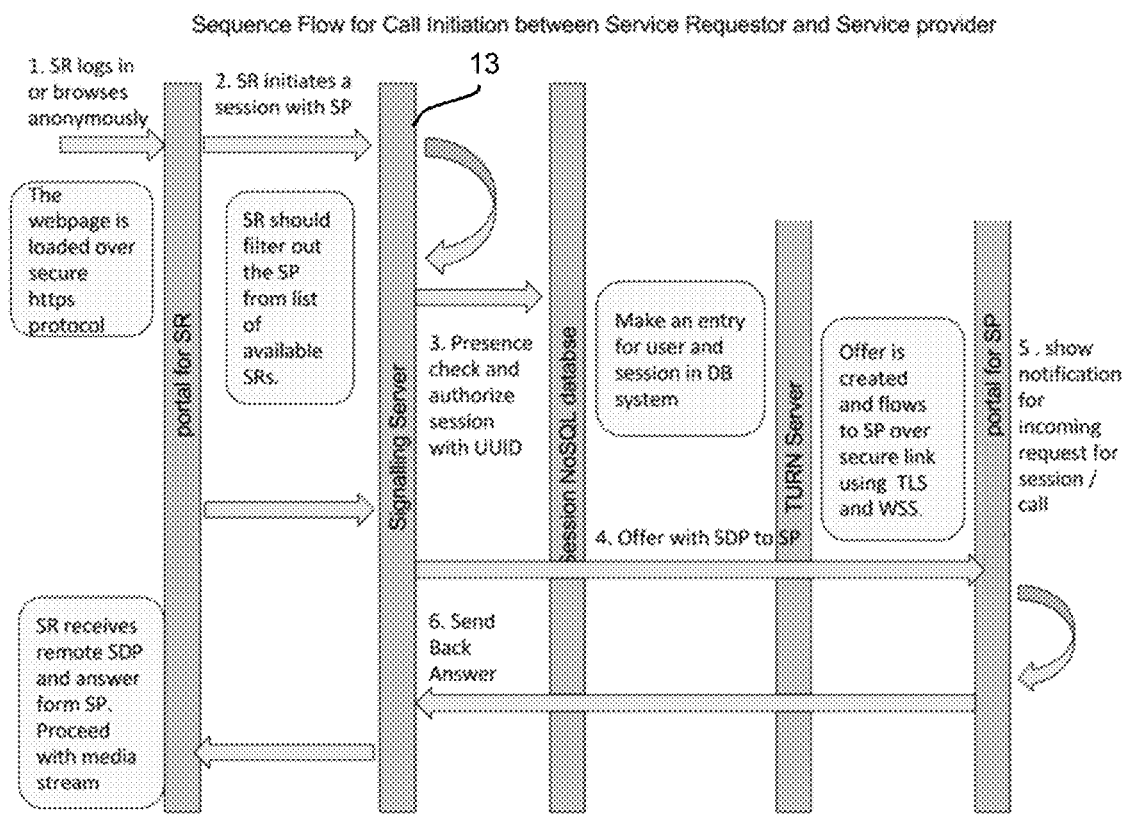
FIG. 4 is another process diagram of the WebRTC offer/answer exchange of FIG. 3.

FIG. 4 shows an example implementation of the offer/answer exchange in a service requester/provider context. The service requester (SR) is a person (conference host) wishing to set up a conference session with another person (conference invitee), referred to as the service provider (SP). For example, the service requester can be a student in need of tutoring, and the service provider can be one of a number of teachers in a particular field of study. The web portal for SR and web portal for SP may be webpages hosted by web server 12 (FIG. 1).

Figure 5:
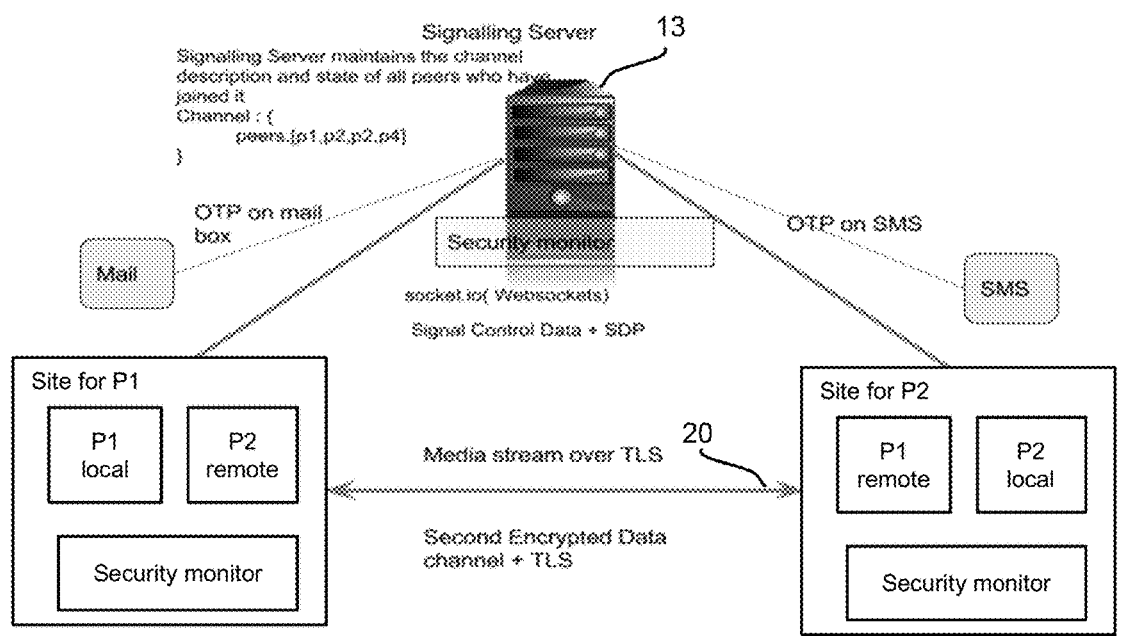
FIG. 5 is a schematic diagram of an example conference session between two peers

Referring to FIG. 5, a two-party conference session with two peers (P1 and P2) is secured by signaling server 13 with real time monitoring and a rule based engine for preventing eavesdropping, ensuring privacy, and avoiding unintended users joining the conference session. A secured session involves the use of a session password and additional health and security monitoring using WebRTC stats API.

In addition, joining the session requires a one-time password (OTP) which is shared by the conference host peer to the conference invitee peer via an electronic message, such as short message service (SMS) or email as non-limiting examples. For example, the electronic message from the conference host peer (one of user devices) to the conference invitee peer (another one of the user devices) may include a hyperlink and/or universal resource locator (URL) as shown in the non-limiting example below.
https://localhost:8086/elearn/index.html?version=100&
name=abc&email=xyz@gmail.com&audio=1&video=
1#7970165361735673

The hyperlink and/or URL for the conference session contains information for adding peers to the conference session such as name, email address, type of session (audio, video, screen, data, etc.) as well a unique session key (e.g., 7970165361735673) denoted by a group of character after the # symbol. The conference session is a timestamp-based entity and cannot be same for two sessions.

Figure 6:
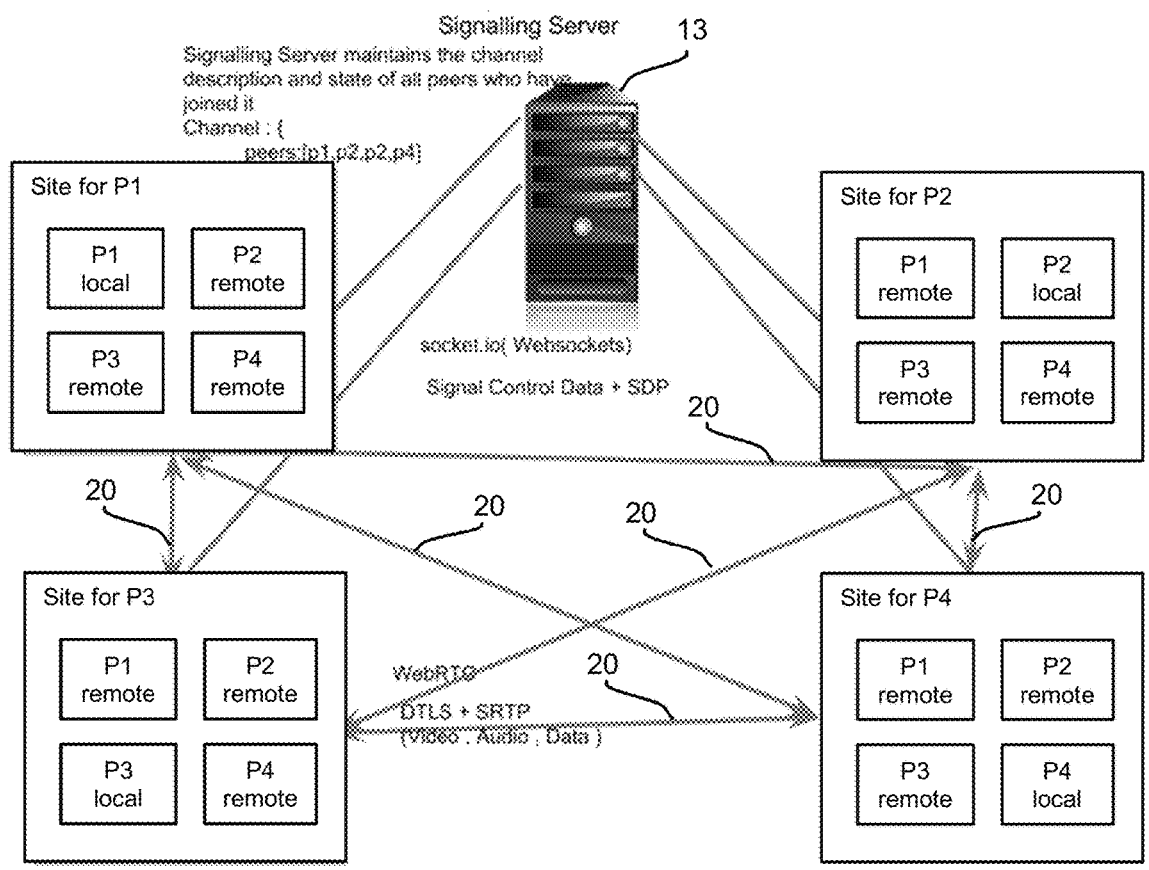
FIG. 6 is a schematic diagram of an example conference session between four peers.

As shown in FIG. 6, the conference session may involve more than two parties. Although four peers (P1 to P4) are illustrated, there can be any number of peers which communicate in the manner shown. Signaling server 13 monitors and tracks the health of all peers with respect to their connection and session.

It is to be understood that descriptions herein stated in terms of sending and receiving information, such as media objects and other types of data, via a peer connection and a data channel to and from a single remote browser (a single remote peer) also encompasses sending and receiving information via peer connections and data channels to and from multiple remote browsers (multiple remote peers).

Various media objects can be generated, uploaded, and received as part of a conference session established according to FIGS. 1 to 6. Media objects are shared between the user devices via connection 20. Connection 20 comprises a peer connection and a data channel. Media objects include file objects and conference capture objects.

File objects are media objects that may exist independently of the conference session. For example, the user of one of the user devices may select a file object, which was previously stored on the user device, to be shared during a conference session with the user of the other user device. File objects include, without limitation: PDF files, image files (e.g., jpg, gif, and png), video files (e.g., mpg, mov, and wmv), and audio files (e.g., mp3, wav, and wma).

Conference capture objects are media objects that are generated by the browser during the conference session. Conference capture objects include screen snapshots and video recordings which are taken during the conference session. For example, the user of one of the user devices may take a screen snapshot of the conference webpage displayed by the browser running on that user device. The user of one of the user devices may, at any time, start a video recording of the conference webpage displayed by the browser running on that user device.

The media objects are managed by the browser of each user device in such a way as to allow each user to access the media objects quickly and easily throughout the conference session. This can be particularly useful when a user presents a series of file objects (e.g., a series of pictures and text documents), and the other users want to go back to view a photograph that was previously discussed and then return to the photograph currently being discussed. The media objects are organized by the browser of each user device in such a way to allow each user to keep track of the media objects in terms of the sequence in which they were shared and who shared them. This can be particularly useful when all users are sharing documents and there is a need to quickly go back and forth between the various documents.

The terms "local" and "remote" are used herein to refer to users in relation to one another, as well as to the their respective user devices, browsers, and media objects. From the perspective of the user of first user device 14, she and the browser she is using are local while the user and browser of second user device 16 are remote. From the perspective of the user of second user device 16, he and the browser he is using are local while the user and browser of first user device 14 are remote.

Numeral 20 designates both the peer connection and data channel between peers. A peer connection API (application program interface) may be used for the core of the peer-to-peer connection between browsers for the user device. The peer connection may be implemented by an RTCPeerConnection interface that represents a WebRTC connection between the local user device (local peer) and the remote user device (remote peer). RTCPeerConnection provides methods for the local user device to connect to the remote user device, maintain and monitor the connection, and close the connection once it is no longer needed. A data channel API may be used to send arbitrary data between the peers. The data channel may be implemented by an RTCDataChannel interface that represents a network channel which can be used for bidirectional peer-to-peer transfers of arbitrary data. Every data channel is associated with an RTCPeerConnection, and each peer connection can have up to a theoretical maximum of 65,534 data channels. The actual limit may vary from browser to browser.

In a non-limiting aspect, it is possible to communicate video streams (discussed below) via the peer connection, and all other data types (such as media objects, screen shots, and pointer coordinates discussed blow) are communicated via one or more data channels. The video streams are not communicated via the data channel, and all other data types (such as media objects, screen shots, and pointer coordinates) are not communicated via the peer connection.

Referring again to FIG. 2, work space 22 includes screen share window 26, media object viewing windows 28L and 28R, and media object tracking windows 30L and 30R. Numeral 28 is used to refer to both 28L and 28R, and numeral 30 is used to refer to both 30L and 30R. The letters L and R are abbreviations for local and remote. For example, if we assume that FIG. 2 shows conference webpage 18 seen by the user of first device 14, we can describe conference webpage 18 in terms of a local user (the user of first user device 14) and a remote user (the user of second user device 16). Media object viewing window 28L displays the contents of a local media object (e.g., PDF document or digital photograph) shared by the local user. Media object tracking window 30L displays a time sequential and cumulative list of local media objects shared by the local user. Media object viewing window 28R displays the contents of a remote media object shared by the remote user. Media object tracking window 30R displays a time sequential and cumulative list of remote media objects shared by the remote user. The two cumulative lists of media objects are populated and depopulated continuously to include and remove media object names in real-time as media objects are shared and deleted during the course of the conference session.

Figure 7:
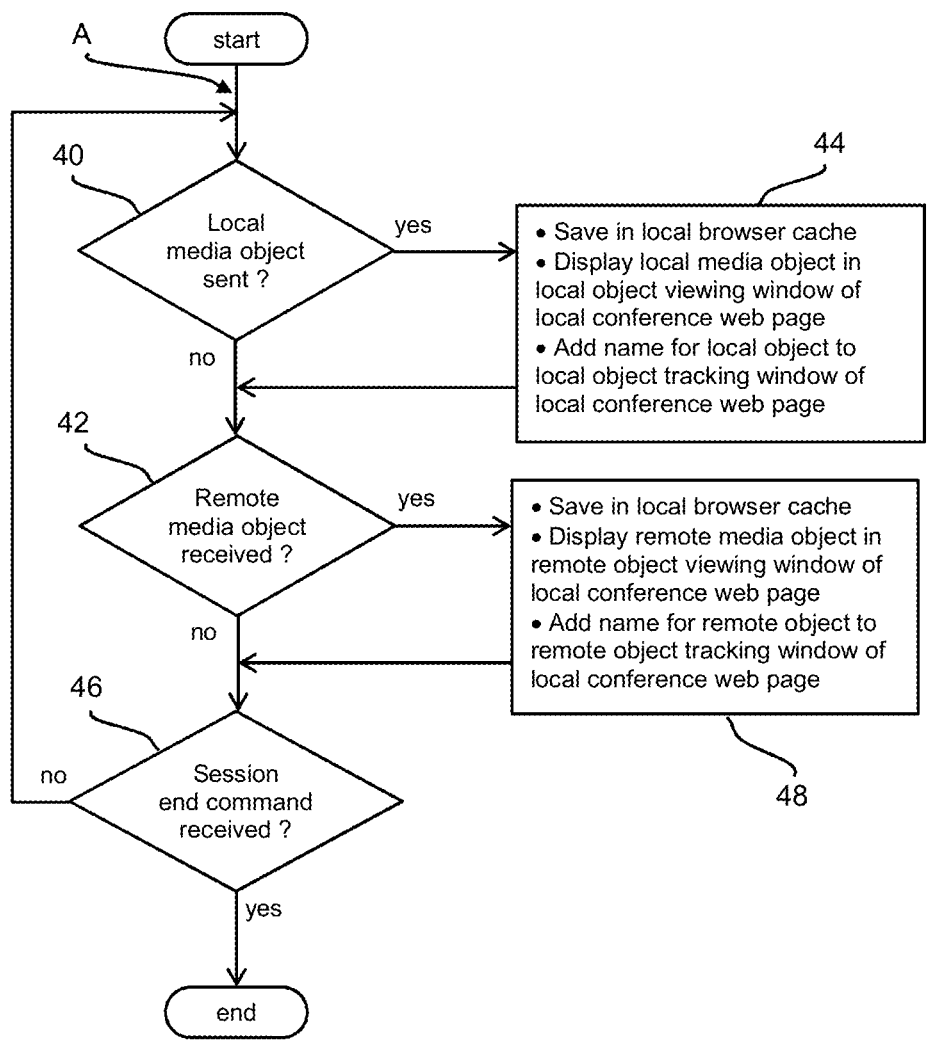
FIG. 7 is a process diagram of a file sharing activity.

FIG. 7 shows an example process, performed by each user device according to its browser, for handling media objects. At block 40, the browser (local browser) determines whether it sent, via the peer connection, a local media object to the browser (remote browser) of the other user device. If no, the process proceeds to block 42. If yes, the process proceeds to block 44 where the local media object is stored in cache memory of the local browser, the local media object is displayed in local object viewing window 28L, its name is added to local object tracking window 30L, and the process proceeds to block 42. In local object viewing window 28L, the local media object that was recently sent will be displayed and will replace any previous local media object that was displayed there. In local object tracking window 30L, the names for any previous local media objects will remain so that any of them can be viewed again later if desired by the local user.

At block 42, the local browser determines whether it has received, via the peer connection, a remote media object from the remote browser of the other user device. If no, the process proceeds to block 46. If yes, the process proceeds to block 48 where the remote media object is stored in cache memory of the local browser, the remote media object is displayed in remote object viewing window 28R, its name is added to remote object tracking window 30R, and the process proceeds to block 46. In remote object viewing window 28R, the remote media object that was recently received will be displayed and will replace any previous remote media object that was displayed there. In remote object tracking window 30R, the names for any previous remote media objects will remain so that any of them can be viewed again later if desired by the local user.

At block 46, the local browser determines whether a conference session end command has been generated. A conference session end command may be generated at the local browser when the user presses session end button 49 (FIG. 2). If yes at block 46, the process ends. If no at block 46, the process loops back to entry point A. Alternatively, the process may proceed to entry point A of any of the other processes described herein.

Figure 8:
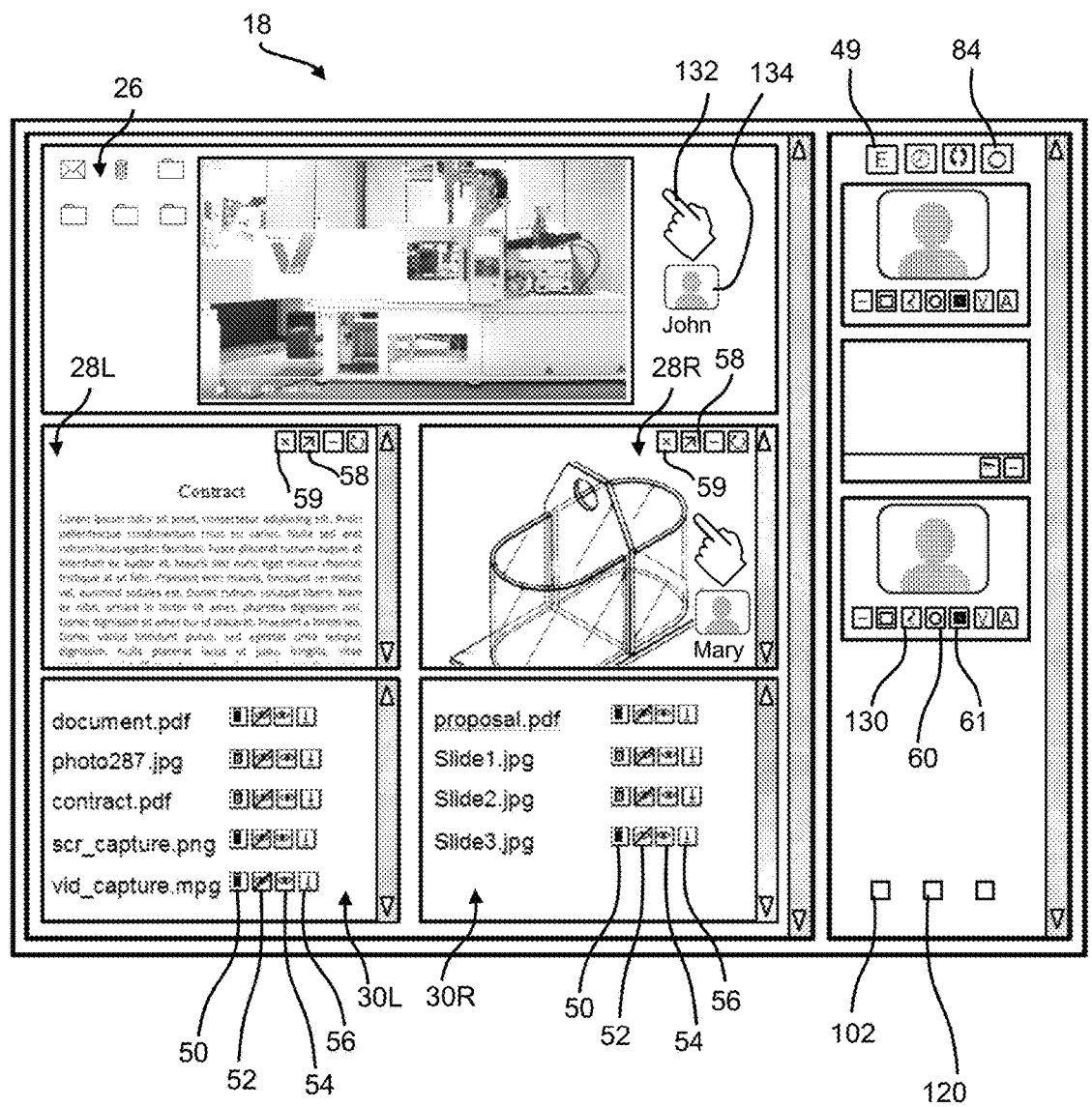
FIG. 8 is a schematic diagram of the conference webpage of FIG. 2 after having been populated with media objects.

FIG. 8 shows conference webpage 18 that can be displayed by the browsers running on first user device 14 and second user device 16. In the descriptions that follow, we assume that FIG. 8 shows the local conference webpage that is being displayed by the local browser running on the local user device.

Local object tracking window 30L lists the names of three file objects in the order that they were uploaded by the local browser and sent via the peer connection to the remote browser. The first file object was "document.pdf," followed by "photo287.jpg," and then followed by "contract.pdf." File object "contract.pdf" is currently displayed in local object viewing window 28L. Later, the local browser created two conference capture objects ("scr_capture.png" and "vid_capture.mpg") which will be described below.

A video conference method may comprise performing a series of local object handling cycles. For example, the first local object handling cycle involves handling of photo287.jpg, whereby photo287.jpg is sent via the peer connection, its contents are displayed in local object viewing window 28L by replacing a prior-sent local file object (document.pdf) displayed in local object viewing window 28L, and its name is added to a cumulative list which already includes the name document.pdf. The name photo287.jpg is added in time sequential order (e.g., after document.pdf) so that it is clear that photo287.jpg came after document.pdf.

The second local object handling cycle involves handling of contract.pdf, whereby contract.pdf is sent via the peer connection, its contents are displayed in local object viewing window 28L by replacing the prior-received local file object (photo287.jpg) displayed in local object viewing window 28L, and its name is added to the cumulative list which already includes the names document.pdf and photo287.jpg. The name contract.pdf is added in time sequential order (e.g., after photo287.jpg) so that it is clear that contract.pdf came after photo287.jpg.

Optionally, when the name of a local object is added to the cumulative list in local tracking window 30L, its name is added along with metadata about the local object such as its file type (e.g., pdf. Txt, jpeg, png) and size (e.g., in kilobytes or megabytes).

Remote object tracking window 30R lists the names of four file objects in the order that they were uploaded by the remote browser and sent via the peer connection to the local browser. The first file object was "proposal.pdf," followed by "Slide1.jpg," "Slide2.jpg," and "Slide3.jpg." File object "Slide3.jpg" is being displayed in remote object viewing window 28R.

A video conference method may comprise performing a series of remote object handling cycles. For example, the first remote object handling cycle involves handling of Slide1.jpg, whereby Slide.jpg is received via the peer connection, its contents are displayed in remote object viewing window 28R by replacing a prior-received remote file object (proposal.pdf) displayed in remote object viewing window 28R, and its name is added to a cumulative list which already includes the name proposal.pdf. The name Slide1.jpg is added in time sequential order (e.g., after proposal.pdf) so that it is clear that Slide1.jpg came after proposal.pdf.

The second remote object handling cycle involves handling of Slide2.jpg, whereby Slide2.pdf is received via the peer connection, its contents are displayed in remote object viewing window 28R by replacing the prior-received remote file object (Slide1.pdf) displayed in remote object viewing window 28R, and its name is added to the cumulative list which already includes the names proposal.pdf and Slide1.jpg. The name Slide2.pdf is added in time sequential order (e.g., after Slide1.jpg) so that it is clear that Slide2.pdf came after Slide1.jpg.

Optionally, each remote object handling cycle further includes generating a remote file object time stamp that places the remote file object in time sequential order relative to the other the remote file objects. For example, the remote file object time stamp for Slide1.jpg (e.g., 12:50) would place Slide1.jpg before Slide2.jpg (e.g., 13:05), and the remote file object time stamp for Slide2.jpg would place Slide2.jpg before Slide3.jpg (13:12).

Optionally, each local object handling cycle further includes generating a local file object time stamp that places the local file object in time sequential order relative to the other the local file objects. For example, the local file object time stamp for photo287.jpg (e.g., 13:00) would place photo287.jpg before contract.pdf (e.g., 13:10).

In the above example situation, the remote file object time stamps (12:50, 13:05, and 13:12) are interspersed in time among the local file object time stamps (13:00 and 13:10) such that the remote object handling cycles are performed concurrently with the local object handling cycles. Here, the term "concurrently" means that at least one of the remote object handling cycles (namely, the cycle of Slide2.jpg) is performed (in terms of timing) between two of the local object handling cycles (namely, the cycles for photo287.jpg and contract.pdf).

Optionally, when the name of a remote object is added to the cumulative list in remote tracking window 30R, its name is added along with metadata about the local object such as its file type (e.g., pdf. Txt, jpeg, png) and size (e.g., in kilobytes or megabytes).

Each of tracking windows 30L and 30R includes controls that allow the user to access and keep a copy of any media object listed in the tracking windows. The tracking windows include delete buttons 50 for deleting a selected media object name from the sequential list of names in tracking window 30L or 30R, view off buttons 52 for removing a selected media object from viewing window 28L or 28R, view on buttons 54 for displaying a selected media object in viewing window 28L or 28R, and save buttons 56 for creating an electronic copy of a selected local or remote media object from the cache memory of the local browser and saving the electronic copy to a designated location in the user device. For example, the electronic copy of a local or remote media object can be saved by the local browser in the download folder within a directory established by an operating system running on the local user device.

For example, after the two local object handling cycles described above are performed, button 54 in local object viewing window 28L for photo287.jpg may be pressed by the user. This will cause contents of the local object file (currently contract.pdf) displayed in local object tracking window 28L to be replaced with contents of one of the local object files (photo287.jpg) named in the cumulative list displayed in local object tracking window 28L. Thus, the user is able to go back to view an earlier media object.

For example, after the two remote object handling cycles described above are performed, button 56 in remote object viewing window 28R for proposal.pdf may be pressed by the user. This will cause an electronic copy of proposal.pdf to be created in a designated location in the local user device.

Thus, the user is able to selectively save any media object of particular interest to him or her.

For example, after the two local object handling cycles described above are performed, button 50 in local object viewing window 28L for document.pdf may be pressed by the user. This will cause one of the names (document.pdf) to be deleted from the cumulative list displayed in local object tracking window 30L. Thus, the user is able to selectively remove any of his or her media objects from the virtual conference table which is simulated by conference webpage 18.

Each of the media object viewing windows 28L and 28R has maximize-minimize buttons 58 that allows the user to enlarge or minimize any one of the object viewing windows. Each of the media object viewing windows 28L and 28R has remove minimize buttons 59 that clear out the media object view window such that no media object is displayed in the media object view window.

Optionally, object viewing windows 28L and 28R may be combined or unified so that conference web page 18 has a single object viewing window for showing both local and remote media objects.

Optionally, object tracking windows 30L and 30R may be combined or unified so that conference web page 18 has a single object tracking window for showing names of both local and remote objects in a time sequential cumulative list.

Figure 9:
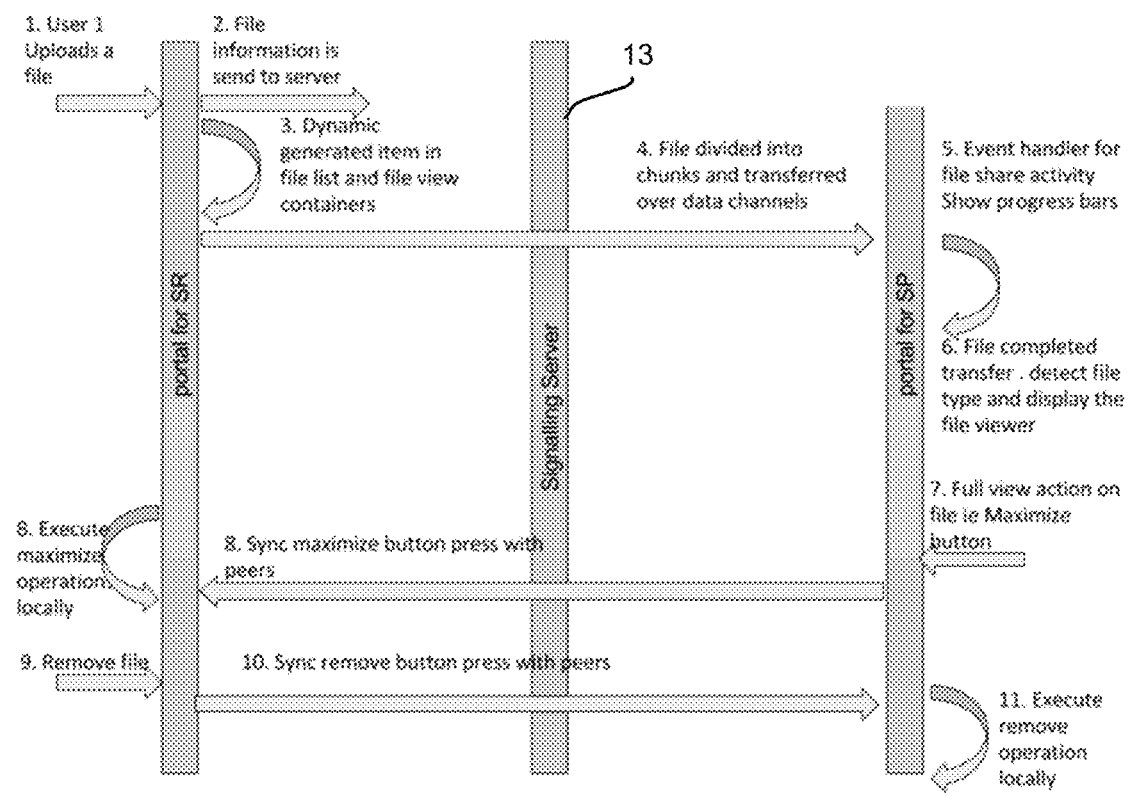
FIG. 9 is another process diagram of the file sharing activity of FIG. 7 with the addition of synchronization of view maximization and removal.

FIG. 9 illustrates an example implementation of the file sharing process described above. Viewing activity is synchronized among the local and remote browsers. When one of the users presses maximize-minimize button 58 of a particular media object viewing window (file view container), the media object displayed in the media object viewing window is enlarged in the conference webpage of that user and the conference webpages of the other user. This is accomplished by the browser of that user sending a sync maximize signal (arrow 8) via the peer connection to the browsers of the other users. When one of the users presses remove button 59 of a particular media object viewing window, the media object that was displayed in the media object viewing window is removed from view in the conference webpage of that user and the conference webpages of the other users. This is accomplished by the browser of that user sending a sync remove signal (arrow 10) via the peer connection to the browsers of the other users.

Referring again to FIG. 8, local conference webpage 18 includes controls that allow the user to create conference capture objects. Conference webpage 18 includes video record control button 60 for creating a type of conference capture object. When the local user clicks on video record control button 60, a video record start command is generated, which causes the local browser to begin a video recording of local conference webpage 18. The video recording at least includes the real-time video data of the users (conference participants) that is being played in communication space 24 of local conference webpage 18, and optionally further includes what is being displayed in work space 24 of local conference webpage 18. A video record stop command is generated when the user clicks on video record control button 60 again.

Conference webpage 18 includes snapshot control button 61 for creating another type of conference capture object, namely a snapshot of local conference webpage 18. The snapshot is a static image of the local conference webpage 18. When the user clicks on the snapshot control button, a snapshot command is generated, which causes the local browser to record a static image of local conference webpage 18. The static image includes what is being displayed in work space 24 of local conference webpage 18, and optionally further includes what is being displayed in communication space 24 of local conference webpage 18.

Local tracking windows 30L shows that after "contract.pdf" was uploaded by the local browser, the local browser recorded a static image of local conference webpage 18, and the static image is named "scr_capture.png." The name "scr_capture.png" is added to the cumulative list displayed within local object tracking window 30L and is placed among the names of the local file objects in time sequential order. In the example of FIG. 8, scr_capture.png is placed after contract.pdf to indicate that scr_capture.png came after contract.pdf. Thereafter, the local browser recorded a video recording of local conference webpage 18, the video recording is named "vid_capture.mpg." The name "vid_capture.mpg" is added to the cumulative list displayed within local object tracking window 30L and is placed among the names of the local file objects in time sequential order. In the example of FIG. 8, vid_capture.mpg is placed after contract.pdf (a local file object) to indicate that vid_capture.mpg came after contract.pdf. More specifically, vid_capture.mpg is placed after scr_capture.png (a conference capture object) to indicate that vid_capture.mpg came after scr_capture.png.

Figure 10:
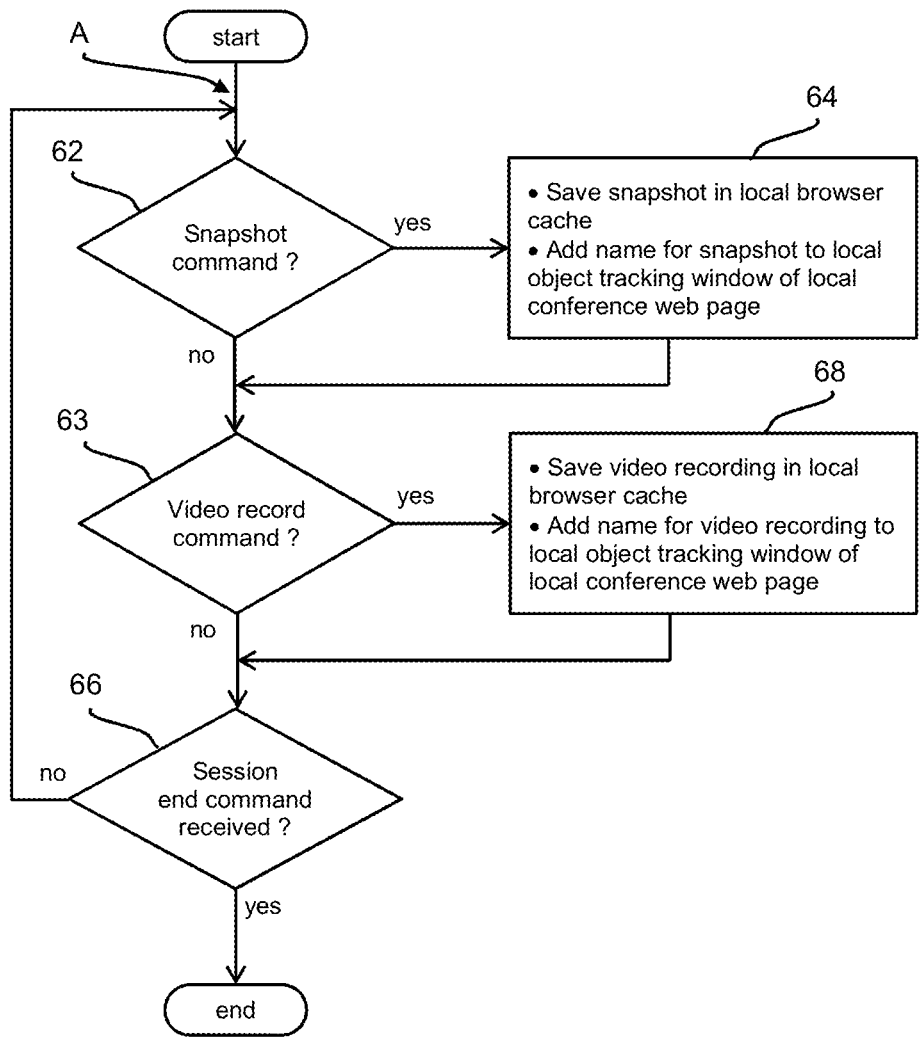
FIG. 10 is a process diagram of conference capturing activity.

FIG. 10 shows an example process, performed by each user device according to its own browser (the local browser), for creating conference capture objects. At block 62, the local browser determines whether a snapshot command has been generated by the local user by clicking snapshot control button 61 (FIG. 8) in local conference webpage 18. If no, the process proceeds to block 63. If yes, the process proceeds to block 64 where the local browser stores the conference session capture object (i.e., the snapshot of local conference webpage 18) in cache memory of the local browser, a name for the snapshot is added to local object tracking window 30L, and the process proceeds to block 63.

At block 63, the local browser determines whether a video record start command has been generated by the local user by clicking video record control button 60 (FIG. 8) in local conference webpage 18. If no, the process proceeds to block 66. If yes, the process proceeds to block 68 where the local browser begins to store the conference session capture object (i.e., the video recording of local conference webpage 18) in cache memory of the local browser, a name for the video recording is added to local object tracking window 30L, and the process proceeds to block 66.

At block 66, the local browser determines whether a conference session end command has been generated. If yes, the process ends. If no, the process loops back to entry point A. Alternatively, the process may proceed to entry point A of any of the other processes described herein.

The local browser maintains a media object list that identifies each media object and its sequential order in media object tracking windows 30L and 30R. The media object list can be stored in the cache memory of the local browser. The media object list is revised whenever a media object is added to or deleted (via delete button 50) from any of the tracking windows. Optionally, the media object list includes a time stamp (e.g., a remote or local file object time stamp) indicating the time elapsed from the start of the conference session to when the media object (e.g., a remote or local file object) was added to the tracking window. The time stamp is also indicative of when a remote file object was received or when a local file object was sent. The media object list can be used to recover from a disruption in the peer connection during the conference session, as described below.

Figure 11:
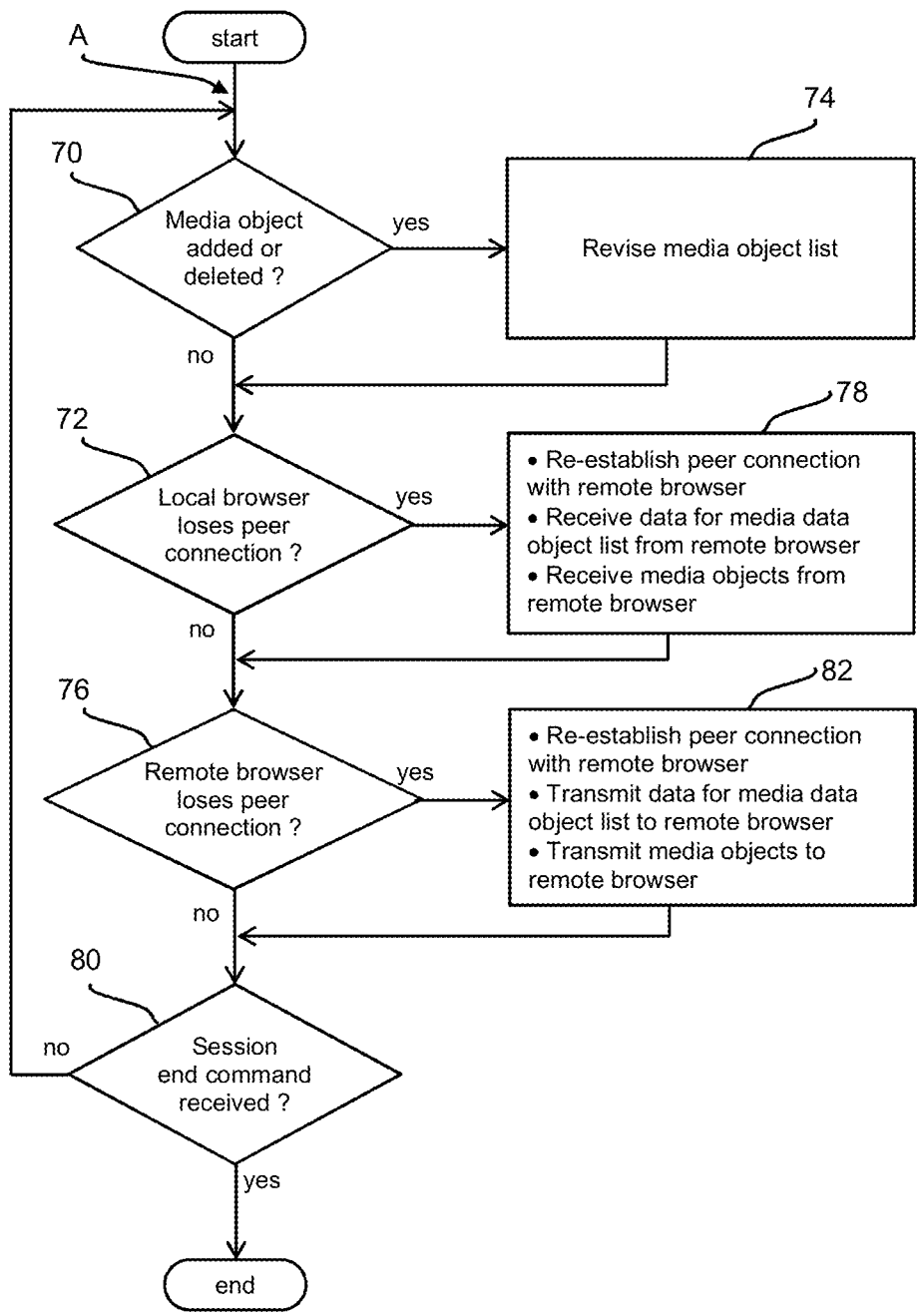
FIG. 11 is a process diagram of reconnect activity.

FIG. 11 shows an example reconnect process to recover from a disruption in the peer connection during the conference session. At block 70, the local browser monitors whether a media object has been added to or deleted from any the media object tracking windows 30L and 30R. As previously discussed, a media object can be added by the local user by causing the local browser to upload a file object (e.g., a PDF document) and sending it to the remote browser. A media object can be added when the local browser receives a file object from the remote browser. A media object can be added by the local user by causing the local browser to generate a conference capture object (e.g., a snapshot or video recording of the conference webpage). A media object can be deleted when the user presses delete button 50 (FIG. 8). If no at block 70, the process proceeds to block 72. If yes at block 70, the process proceeds to block 74 where the local browser revises the media object list, and the process proceeds to block 72. The revised media object list may be stored in the browser cache of the local browser.

At block 72, the local browser monitors whether it (the local browser) loses the peer connection with the remote browser. The local browser can determine loss of the peer connection when there is no response from the remote browser and/or when it receives a connection loss notification from the signaling server 13 (FIGS. 3-5). Loss of the peer connection may occur when the local user device which runs the local browser loses power. Loss of the peer connection may also occur if the local web browser application is closed or terminated.

If no at block 72, the reconnect process proceeds to block 76. If yes at block 72, the reconnect process proceeds to block 78 where the local browser re-establishes a peer connection with the remote browser and also creates a data channel. The peer connection can be re-established using the offer/answer exchange previously described, at which point the remote browser will recognize that the local browser is running on a user device that had been participating in the present conference session that has not yet ended. Such recognition may be accomplished in various ways. For example, the local browser may transmit any one or more of the following verification items which are received by the remote browser: (a) identification data for the local user device; and (b) identification data (e.g., session key) for the conference session which the local browser wishes to participate in. The remote browser may compare any of the received verification items with those for the present conference session. If one or more of the received verification items matches those for the present conference session, the remote browser will permit re-establishment of the peer connection followed by synchronization. In effect, re-establishment means that a new peer connection is established.

A remote-to-local synchronization process is performed at block 78 after the peer connection is re-established. The remote-to-local synchronization process includes the remote browser transmitting data specified by its media object list (referred to as a remote media object list) to the local browser. The local browser receives the data specified by the remote media object list via the new peer connection and its data channel. The data specified by the remote media object list may include, for each media object: a name (e.g., file name), a local-remote indicator that defines whether the media object should be treated as a local media object or a remote media object, and a sequence indicator (e.g., a remote or local file object time stamp) that defines the sequential order of the media object relative to other media objects. The local browser uses the received data to reconstruct its own media object list (referred to as a local media object list).

The remote-to-local synchronization process also includes the remote browser transmitting the media objects to the local browser. The local browser receives the media objects via the new peer connection and stores them in the browser cache of the local browser. After block 78, the reconnect process proceeds to block 76.

At block 76, the local browser monitors whether the remote browser loses the peer connection with the local browser. The local browser can determine loss of the peer connection when there is no response from the remote browser and/or when it receives a connection loss notification from signaling server 13 (FIGS. 3-5). Loss of the peer connection may occur when the user device which runs the remote browser loses power, or when the remote web browser application is closed or terminated.

If no at block 76, the reconnect process proceeds to block 80. If yes at block 76, the reconnect process proceeds to block 82 where the local browser re-establishes a peer connection with the remote browser and also creates is data channel. The peer connection can be re-established using the offer/answer exchange previously described, at which point the local browser will recognize that the remote browser is running on a user device that had been participating in the present conference session that has not yet ended. Such recognition may be accomplished in various ways. For example, the remote browser may transmit any one or more of the following verification items which are received by the local browser: (a) identification data for remote user device; and (b) identification data (e.g., session key) of the conference session which the remote browser wishes to participate in. The local browser may compare any of the received verification items with those for the present conference session. If one or more of the received verification items matches those for the present conference session, the local browser will permit re-establishment of the peer connection followed by synchronization. In effect, re-establishment means that a new peer connection is established.

A local-to-remote synchronization process is performed at block 82 after the peer connection is re-established. The local-to-remote synchronization process includes the local browser transmitting data for its media object list to the remote browser via the new peer connection and its data channel. The remote browser receives the data specified by the local media object list, which may include for each media object: a name (e.g., file name), a local-remote indicator that defines whether the media object should be treated as a local media object or a remote media object, and a sequence indicator (e.g., a remote or local file object time stamp) that defines the sequential order of the media object relative to other media objects. The remote browser uses the received data to reconstruct its remote media object list.

The local-to-remote synchronization process also includes the local browser transmitting the media objects to the remote browser via the new peer connection. The remote browser receives the media objects and stores them in the browser cache of the remote browser. After block 82, the reconnect process proceeds to block 80.

At block 80, the local browser determines whether a conference session end command has been generated. If yes, the reconnect process ends. If no, the process loops back to entry point A. Alternatively, the process may proceed to entry point A of any of the other processes described herein.

Figure 12:
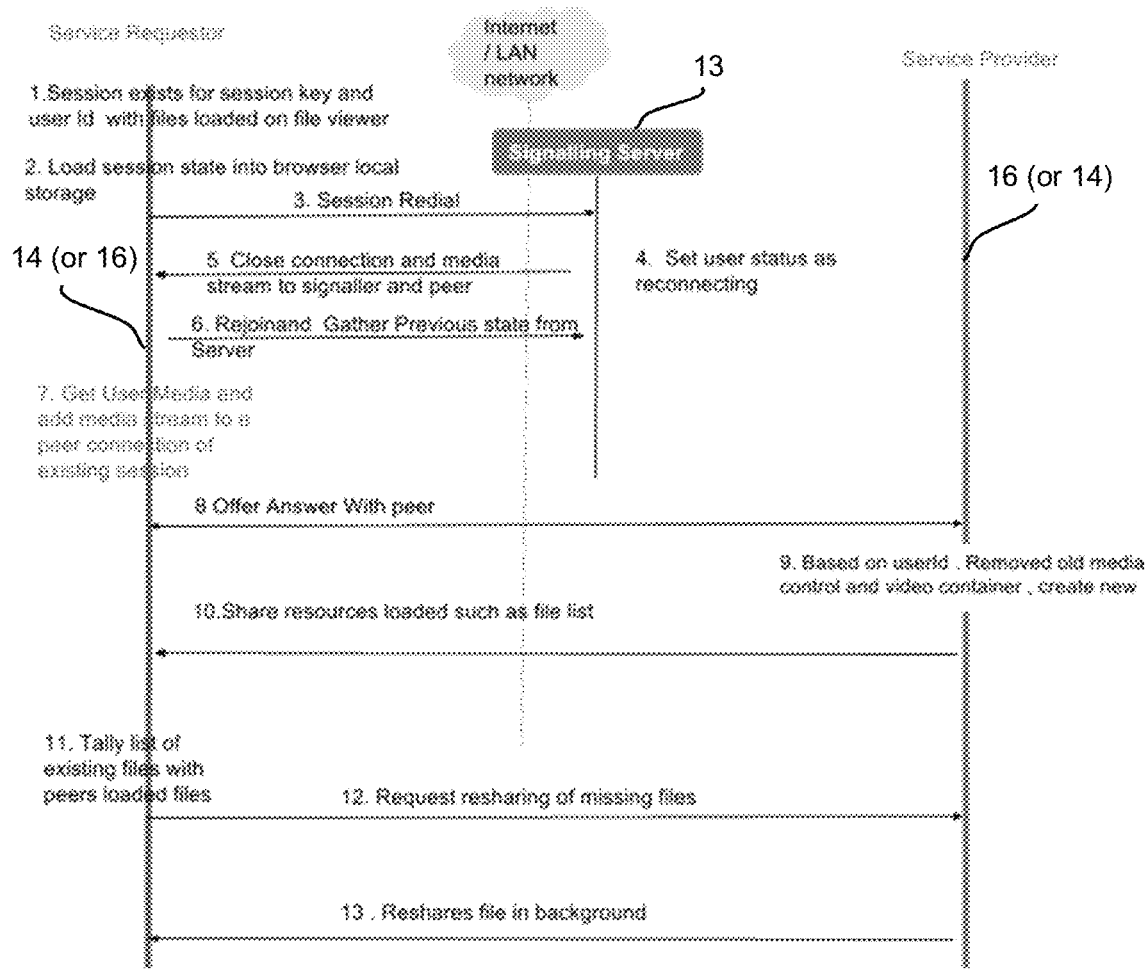
FIG. 12 is another process diagram for the reconnect activity of FIG. 11

FIG. 12 illustrates an example implementation of the reconnect activity described in FIG. 11. The reconnect activity enables any user to rejoin the present conference session without losing all the associated resources loaded onto his browser. Re-establishment of the peer connection involves session disconnect and reconnect from signaling server 13.

In the forgoing description, the media object list was used to recover from a disruption in the peer connection during the conference session. The media object list may also be used to record and replay the conference session. This feature can be useful in a learning context. For example, the local user can be a student and the remote user can be a tutor. The student may wish to replay a tutoring session with the tutor that occurred days earlier. As will be apparent below, the session record and replay function is different from the video recording described for FIG. 8 involving the video record control button 60. During session replay, various share activities are repeated such that object tracking windows are populated with names of media objects, which allows the user to interact with the object tracking windows via delete buttons 50, view off buttons 52, view on buttons 54, and save buttons 56, as previously described.

Figure 13:
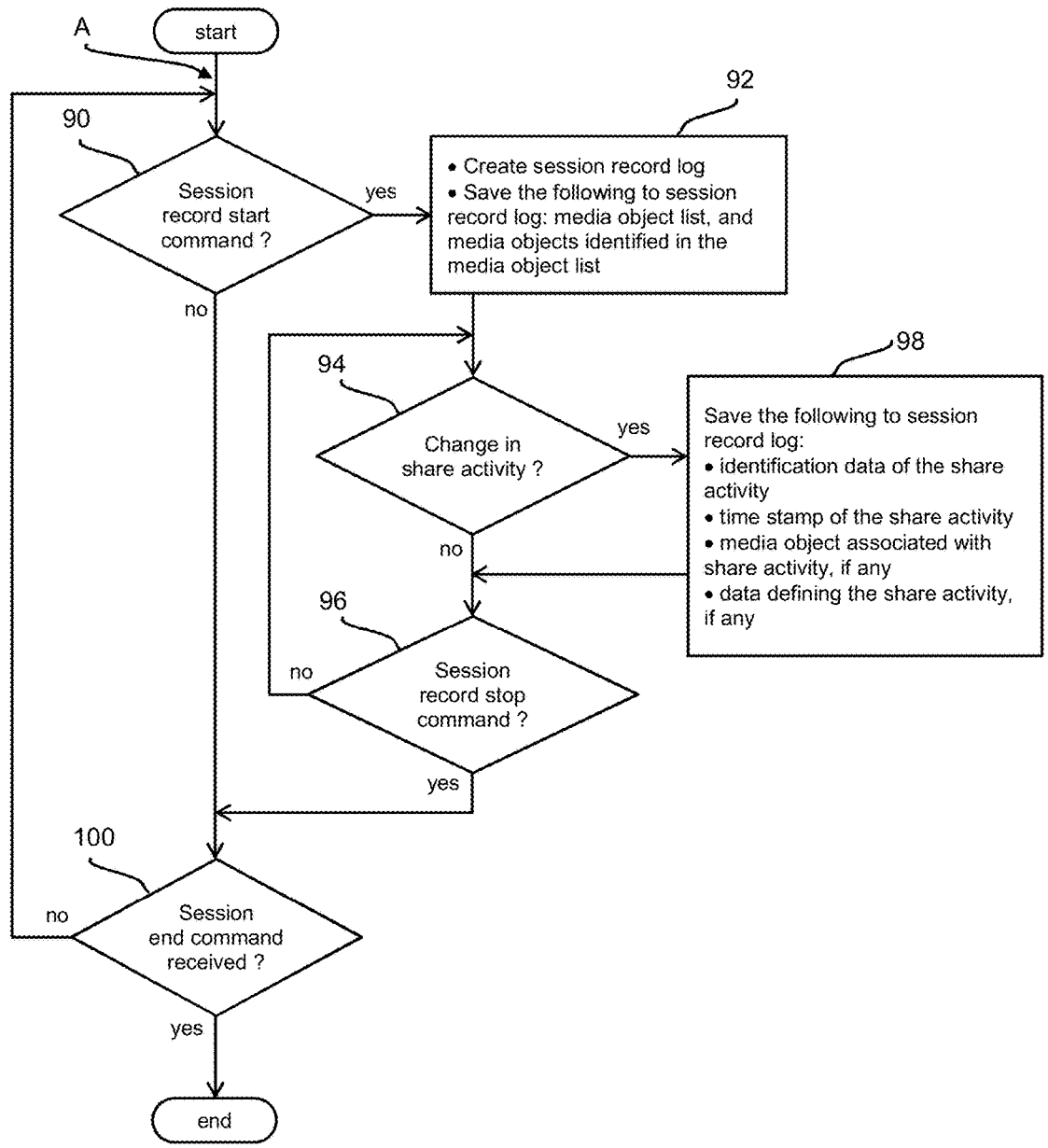
FIG. 13 is a process diagram of session record activity.

Referring again to FIG. 8, local conference webpage 18 may include session record button 84 which allows the local user to start and stop recording of the conference session. A session record start command is generated within the local browser when the local user presses session record button 84. The session record start command causes the local browser to begin recording the conference session as described below. A session record stop command is generated within the local browser when the user presses session record button 84 again. The session record stop command causes the local browser to stop recording the conference session FIG. 13 shows an example process to record and replay the conference session. At block 90, the local browser monitors whether a session record start command has been generated by the local user activating session record button 84 (FIG. 8). If no, the process proceeds to block 100. If yes, the process proceeds to block 92 where the local browser creates a session log. The session log can be an electronic folder to which various objects, user activity, timestamps, and other data are saved. For example, the browser may save into session log may the media objects (or reference URLs of the media objects) named in tracking windows 30L and 30R in FIG. 8 and time stamps for each of those media objects.

The local browser may save the session log in the download folder within a directory established by an operating system running on the local user device. Alternatively or additionally, the local browser transmits the session log to computer server 12 (FIG. 1). Also at block 92, the browser saves the media object list (previously discussed with reference to FIG. 11) to the session log. The browser also saves media objects identified in the media object list to the session log. After block 92, the process proceeds to block 94.

At block 94, the local browser monitors whether there is a change in share activity. Detection in the change in share activity can be accomplished according to any one or more of blocks 40 and 42 in FIG. 7 and blocks 62 and 63 in FIG. 10. Additionally or alternatively, detection in a change in share activity can be accomplished according to descriptions below for screen share activity (blocks 122 and 126 in FIG. 15) and pointer share activity (blocks 140 and 144 in FIG. 17). If no at block 94, the process proceeds to block 96. If yes at block 94, the process proceeds to block 98 where the local browser revises the session log by saving the following items in the session log: identification data of the share activity; a time stamp of the share activity; the media object, if any, associated with the share activity; and any additional data defining the share activity. Each of these examples is discussed below.

Identification data of the share activity includes a type indicator that defines the type of share activity. The type indicator can define the share activity as any of: a local object being sent to the remote browser, a remote object being received from the remote browser, a snapshot of local conference webpage 18 being saved, a video recording of local conference webpage 18 being recorded, screen being shared, a pointer being shared; a text message being sent; media stream of screen being shared; and annotations of any of the media objects.

A time stamp of the share activity includes time data indicating when the share activity was initiated. The time data can include a date and time obtained from the internal clock of the local user device. Additionally or alternatively, the time data can include a time duration measured from the time when the session record start command was generated by the user activating session record button 84 (FIG. 8) to when the share activity was initiated.

The media object associated with the share activity can be any of: a local object being sent to the remote browser, a remote object being received from the remote browser, a snapshot of local conference webpage 18 being saved, and a video recording of local conference webpage 18, screen being shared, a pointer being shared, a text message being sent, media stream of screen being shared, and annotations of any of the media object.

Additional data defining the share activity can be any of: a screen capture image of the screen being shared in screen share window 26 (FIG. 8), screen coordinates and a user identifier for a moving pointer being displayed in local conference webpage 18.

After block 98, the process proceeds to block 96 where the local browser checks whether a session record stop command was generated. As previously discussed, a session record stop command can be generated by the user activating session record button 84 again. If no at block 96, the process returns to block 94. If yes at block 96, the process proceeds to block 100.

At block 100, the local browser determines whether a conference session end command has been generated. If yes, the process ends. If no, the process loops back to entry point A. Alternatively, the process may proceed to entry point A of any of the other processes described herein.

Referring again to FIG. 2, conference webpage 18 may include session replay button 102. A session replay command is generated when the user presses session replay button 102. The session replay command causes the local browser to replay a conference session based on a session log that was previously created. The individual elements of the recorded session separately simulated in the order in which they were shared and acted upon, such as File shared and progress bar transformed to file description after 3 seconds, file maximized after 3.5 seconds, file removed from the file list box and the file share box after 5 seconds.

Figure 14:
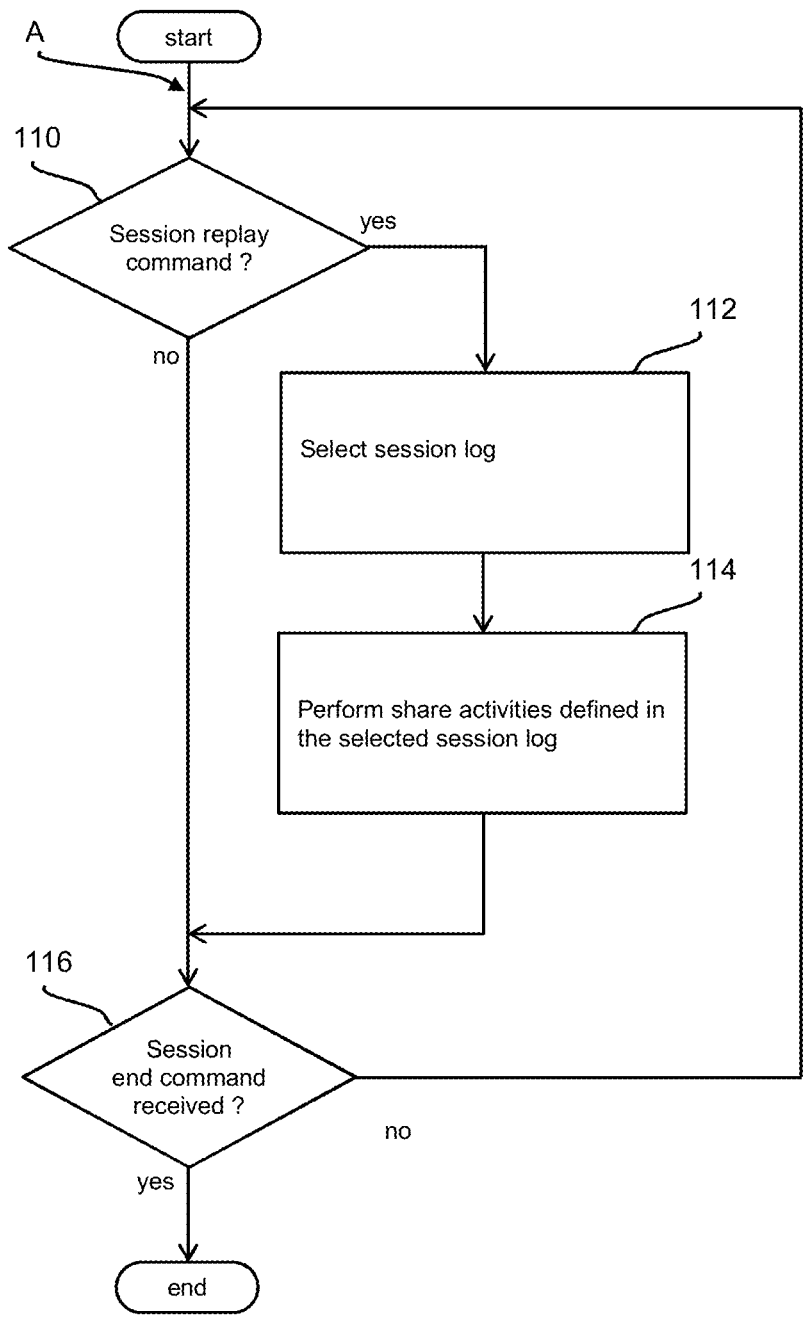
FIG. 14 is a process diagram of session replay activity.

FIG. 14 shows an example process for replaying a conference session based on a session log of a previous conference session. At block 110, the local browser monitors whether a session replay command was generated. If no, the process proceeds to block 116. If yes, the process proceeds to block 112 where the local browser selects a session log at the direction of the local user. For example, the local browser may display a pop-up window within local conference webpage 18, the pop-up window showing a plurality of session logs from which the local user may select one for replay. The session log can be selected and fetched from computer server 12 (FIG. 1) or 13 (FIG. 4) or from a directory established by an operating system running on the local user device.

Next, the process proceeds to block 114 where the local browser performs share activities defined in the selected session log. For example, the local browser will display media objects (e.g., file objects such as PDF documents and electronic photographs) in media object viewing windows 28L and 28R according to the sequential order and timing in which the media objects were shared in the previous conference session. The local browser will populate media object tracking windows 30L and 30R with the names of media objects according to the sequential order and timing in which the media objects were shared in the previous conference session. The local browser will display in screen share window 26 (FIG. 8) an image of the screen shared (see FIG. 15) during the previous conference session according to the time stamp associated with the screen share activity in the session log.

A multimedia conferencing method may comprise performing a repeat of the displaying and adding actions of the series of remote object handling cycles based on the session log fetched from the computer server. For example, the displaying in remote object viewing window 28R and the adding of an object name in remote tracking window 30R are repeated for the first and second remote object handling cycles for Slide1.jpg and Slide2.jpg which were previously described. Displaying and name adding functions are performed according to corresponding remote file object time stamps. As previously discussed, the time stamps for Slide1.jpg and Slide2.jpg may 12:50 and 13:05, respectively. Therefore, the repeated cycle for Slide 2 will be performed 15 minutes after the repeated cycle for Slide1.jpg.

A multimedia conferencing method may comprises performing a repeat of the displaying and adding actions of the series of local object handling cycles based on the session log fetched from the computer server. For example, the displaying in local object viewing window 28L and the adding of an object name in local tracking window 30L are repeated for the first and second remote object handling cycles for photo287.jpg and contract.pdf which were previously described. Displaying and name adding functions are performed according to corresponding local file object time stamps. As previously discussed, the time stamps for photo287.jpg and contract.pdf may 13:00 and 13:10, respectively. Therefore, the repeated cycle for contract.pdf will be performed 10 minutes after the repeated cycle for contract.pdf.

In the above example, the remote file object time stamps (e.g., 13:05 for Slide2.jpg) are interspersed in time among the local file object time stamps (e.g., 13:00 and 13:10 for photo287.jpg and contract.pdf) such that the repeat of the series of remote object handling cycles is performed concurrently with the repeat of the series of local object handling cycles. Here, the term "concurrently" means that the repeat for at least one of the remote object handling cycles (namely, the cycle of Slide2.jpg) is performed (in terms of timing) between the repeats of two of the local object handling cycles (namely, the cycles for photo287.jpg and contract.pdf).

A peer connection to the remote user device may be unnecessary during replay since the repeated object handling cycles are performed based on the session log. Thus, in some aspects, the repeated object handling cycles are performed without receiving the remote file objects from the remote user device again as it uses the files from the local device memory to repeat the operations as happened in the original session and/or without sending the local file objects to the remote user device again as it uses the files from the local device memory to repeat the operations as happened in the original session.

In this situation, a peer connection to the remote user device is not required during replay. Thus, in a tutoring context, a student is able to replay a previous tutoring session without the tutor. The student is able to interact with the conference session by pressing delete buttons 50, view off buttons 52, view on buttons 54, and save buttons 56 in object tracking windows 30L and 30R, as previously described. For example, the student is able to selectively save any media object of particular interest to him or her by clicking on the appropriate save button 56.

As a further example, a multimedia conferencing method may comprise the local user device (or local browser running on the local user device) receiving the sync maximize signal via the peer connection as a result of the user activating button 58 as previously described in FIG. 9, and enlarging remote object viewing window 28R (enlargement activity) in response to the received sync maximize signal. Timing of enlargement activity will be saved by the local browser in a session log if the local user had pressed session record button 84 previously described. The session replay data, which was saved by the local browser in the session log and transmitted to computer server 13 (or 12), will include a time stamp for the sync maximize signal indicating a time when the sync maximize signal was received. When the recorded session is replayed, the local browser will perform a repeat of the enlargement activity based on the session log fetched from the computer server.

In some aspects, the time stamp for the sync maximize signal could be interposed in time among the time stamps for the remote file object time stamps such that the repeated enlargement activity is performed concurrently with the repeat of the series of remote object handling cycles. For example, the time stamp for the sync maximize signal could be 13:04 while the remote file object time stamps for Slide1.jpg and Slide2.jpg could 12:50 and 13:05, respectively, such that the repeated enlargement activity is performed concurrently with the repeat for the remote object handling cycles for Slide1.jpg and Slide2.jpg. Here, the term "concurrently" means that the repeated enlargement activity is performed (in terms of timing) between two of the remote object handling cycles.

In another example, a multimedia conferencing method comprises the local user device (or local browser running on the local user device) receiving the sync remove signal via the peer connection as a result of the remote user activating button 59 on the remote conference webpage, and removing contents (removal activity) of a remote object from remote object viewing window 28R of the local conference webpage in response to the received sync remove signal. Timing of the removal activity will be saved by the local browser in a session log if the local user had pressed session record button 84 previously described. The session replay data, which was saved by the local browser in the session log and transmitted to computer server 13 (or 12), includes a time stamp for the sync remove signal indicating a time when the sync remove signal was received. When the recorded session is replayed, the local browser will perform a repeat of the removal activity based on the session log fetched from the computer server.

In some aspects, the time stamp for the sync remove signal is interposed in time among the time stamps for the remote file object time stamps such that the repeated removal activity is performed concurrently with the repeat of the series of remote object handling cycles. For example, the time stamp for the sync removal signal could be 12:51 while the remote file object time stamps for Slide1.jpg and Slide2.jpg could 12:50 and 13:05, respectively, such that the repeated removal activity is performed concurrently with the repeat for the remote object handling cycles for Slide1.jpg and Slide2.jpg. Here, the term "concurrently" means that the repeated removal activity is performed (in terms of timing) between two of the remote object handling cycles.

Still referring to FIG. 14, at block 116 the local browser determines whether a conference session end command has been generated. If yes, the process ends. If no, the process loops back to entry point A. Alternatively, the process may proceed to entry point A of any of the other processes described herein.

Referring again to FIG. 8, we still assume that it shows local conference webpage 18. Local conference webpage 18 is what is being viewed by the local user. Local conference webpage 18 may include screen share button 120. The following description for screen sharing is provided with the terms "local" and "remote" being applied to the users, browsers, user devices, and the like. It is also to be understood that the same description applies by switching the terms "local" and "remote" with each other.

A screen share start command is generated at the local browser when the local user presses screen share button 120. The screen share start command causes the local browser to take a video stream of the local display screen (of the local user device being used by the local user) and transmit the video stream via the peer connection to the remote browser in real-time, to allow the remote browser to display the video stream in real-time within the screen share window of the remote conference webpage. This makes it possible for the local user to play a video recording on the local display screen which can be seen by the remote user on his remote display screen. The local user may pause and restart the video recording as desired. This also makes it possible for the local user to play slides of a Microsoft PowerPoint® or similar presentation on the local display screen while the remote user is able to see the same presentation on his remote display screen. This also makes it possible for the local user to open a text document using a word processing program, and scroll through the text document on the local display screen while the remote user is able to watch the scrolling action on his remote display screen. Optionally, the video stream is transmitted via only the peer connection and is not transmitted via a data channel.

A screen share stop command is generated at the local browser when the local user presses screen share button 120 again. The screen share stop command causes the local browser stop sampling the local display screen, stop sending screen capture images to the remote browser, and to clear the screen share window of the remote conference webpage.

Figure 15:
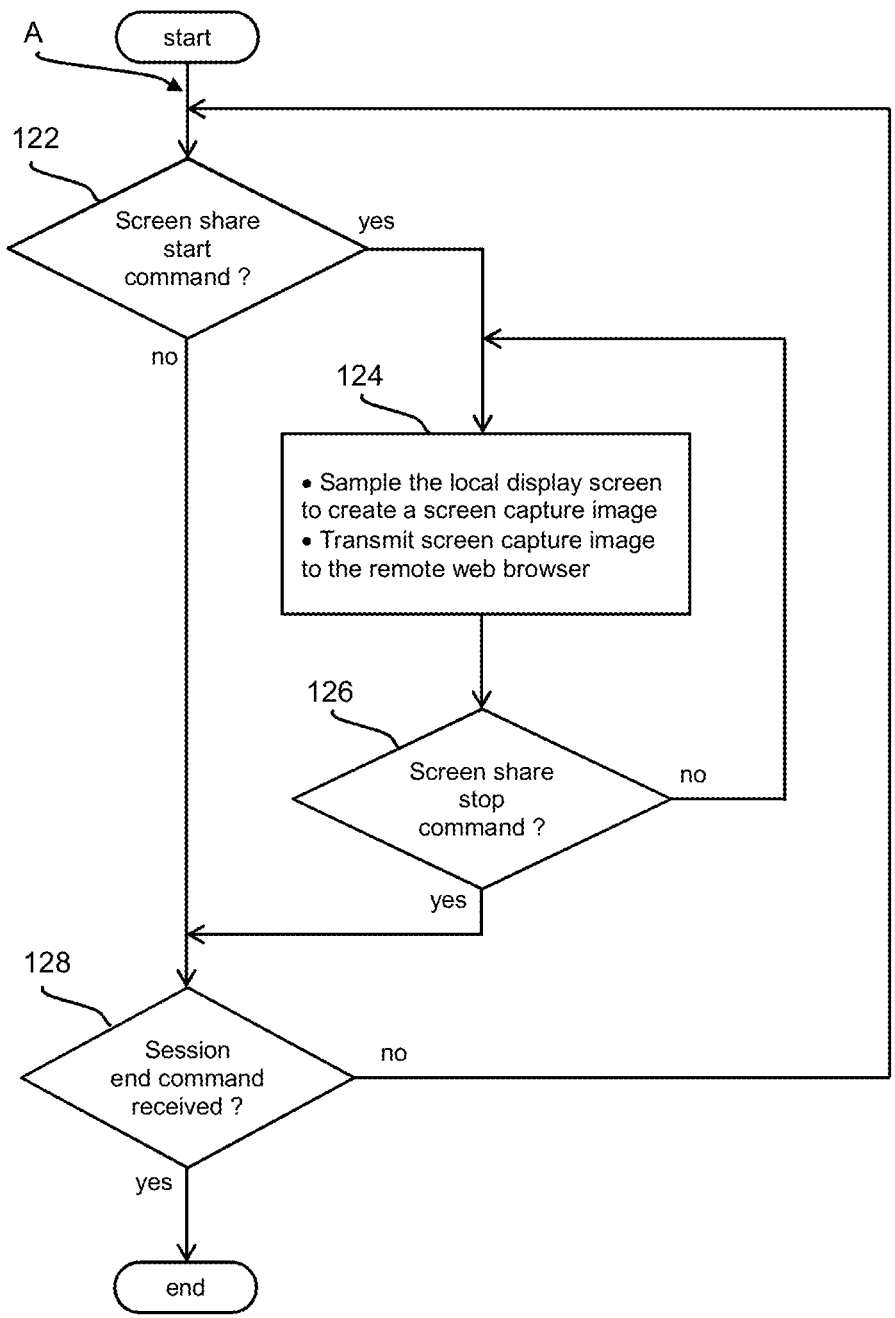
FIG. 15 is a process diagram of screen share activity.

FIG. 15 shows an example process for screen sharing. At block 122, the local browser monitors whether a screen share start command has been generated. If no, the screen share process proceeds to block 128. If yes, the screen share process proceeds to block 124 where the local browser captures the local display screen to create a video stream, and then transmits the video stream to the remote browser via the peer connection. This enables the remote browser to display the video stream in the screen share window of the remote conference webpage shown on the remote display screen. The screen share video stream can be transmitted via a second (parallel) peer connection to the remote browser. The second peer connection is in addition to the existing peer connection which would be used for additional video or audio stream sharing activities. After block 124, the screen share process proceeds to block 126.

At block 126, the local browser monitors whether a screen share stop command has been generated. If no, the screen share process returns to block 124. If yes at block 126, the screen share process proceeds to block 128.

At block 128, the local browser determines whether a conference session end command has been generated. If yes, the process ends. If no, the process loops back to entry point A. Alternatively, the process may proceed to entry point A of any of the other processes described herein.

Figure 16:
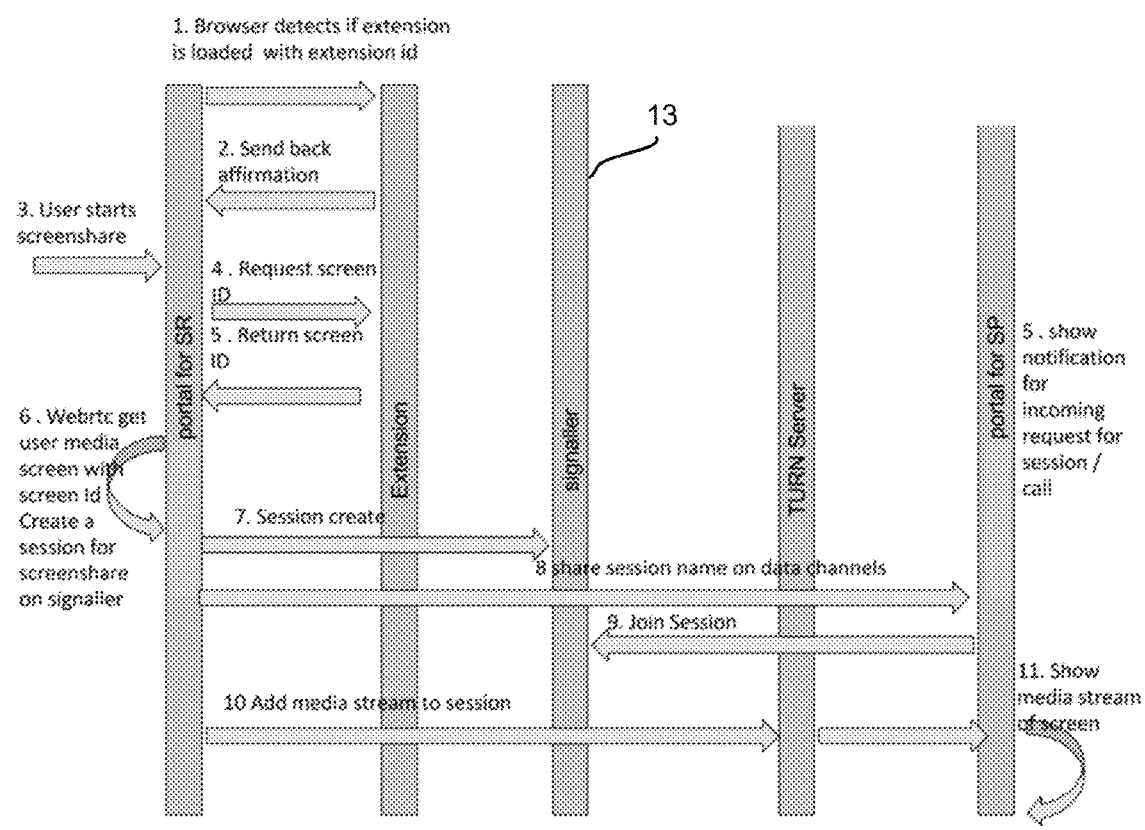
FIG. 16 is another process diagram of the screen share activity of FIG. 15.

FIG. 16 illustrates an example implementation of the screen share process described above. The screen share process allows a user to share their entire screen or single tab with the help of an extension in the web browser application. The listeners in the extension background script gather the source ID of the screen to be shared and the program then converts it into a media data stream. A parallel WebRTC session is created for the screen share media data stream in addition to the existing WebRTC session.

A multimedia conferencing method may comprise establishing a parallel peer connection as described above while maintaining the peer connection used for transferring file objects and the like. The method comprises the local user device (or local browser running on the local user device) receiving a video stream of the remote screen via the parallel peer connection, and performing a remote screen share activity by displaying the video stream within the local conference webpage. The remote screen share activity will be saved by the local browser in a session log if the user had pressed session record button 84 previously described. The session replay data, which was saved by the local browser in the session log and transmitted to the computer server 12 (or 13), will include the sequence of remote screen share activity and a time stamp for the sequence of operations performed on remote screen's video stream during remote screen share activity. The recording of screen's video stream will be stored as local file object. When the recorded session is replayed, the local browser will perform a repeat of the remote screen share activity based on the session log fetched from the computer server and locally stored file objects containing recording of the screen's video stream.

In some aspects, the time stamp for the series of remote screen capture images is interposed in time among the time stamps for the remote file object time stamps such that the repeat of the remote screen share activity is performed concurrently with the repeat of the series of remote object handling cycles. For example, the time stamp for the series of remote screen capture images could be 13:03 while the remote file object time stamps for Slide1.jpg and Slide2.jpg could 12:50 and 13:05, respectively, such that the repeated remote screen share activity is performed concurrently with the repeat for the remote object handling cycles for Slide1.jpg and Slide2.jpg. Here, the term "concurrently" means that at least a portion of the repeated remote screen share activity is performed (in terms of timing) between two of the remote object handling cycles.

Referring again to FIG. 8, we again assume that it shows local conference webpage 18. Local conference webpage 18 is what is being viewed by the local user. Local conference webpage 18 may include pointer share button 130. The following description for pointer sharing is provided with the terms "local" and "remote" being applied to the users, browsers, user devices, and the like. It is also to be understood that the same description applies by switching the terms "local" and "remote" with each other.

A pointer share command is generated at the local browser when the local user presses pointer share button 130 in local conference webpage 18. The pointer share command causes the local browser to display pointer icon 132 on local conference webpage 18 at the control of the local user. For example, the local user may control movement of pointer icon 132 using a user input device, such as a touch-sensitive screen, a mouse, or cursor control buttons on a keyboard, as non-limiting examples. The user input device (168 in FIG. 21) can be built into or connected to the local user device. Based on input from the user, the user input device alters the screen coordinates of pointer icon 132, causing pointer icon 132 to move across local conference webpage 18.

The pointer share command also causes the local browser to transmit, via the data channel, the screen coordinates in real-time to the remote browser so that the remote browser can display a similar pointer icon in the remote conference webpage at the same location as in local conference webpage 18. This allows the local user to control the pointer icon on the remote conference webpage in real-time.

Optionally, the pointer share command may also cause the local browser to transmit, via the data channel, user identifier 134 that identifies the local user who is in control of the pointer icon. User identifier 134 is displayed adjacent to the pointer icon. This allows multiple users to share pointers so that when multiple pointer icons appear, the users will know who is in control of each pointer icon. User identifier 134 may include any of a snapshot image of the local user and a name of the local user. At the time when the local user presses pointer share button 130, the local browser may cause the camera of the local user device to take a snapshot image of the local user.

A pointer share stop command is generated at the local browser when the local user presses pointer share button 130 again. The pointer share stop command causes the local browser to remove the pointer icon from local and remote conference webpages and to stop sending screen coordinates to the remote browser.

Figure 17:
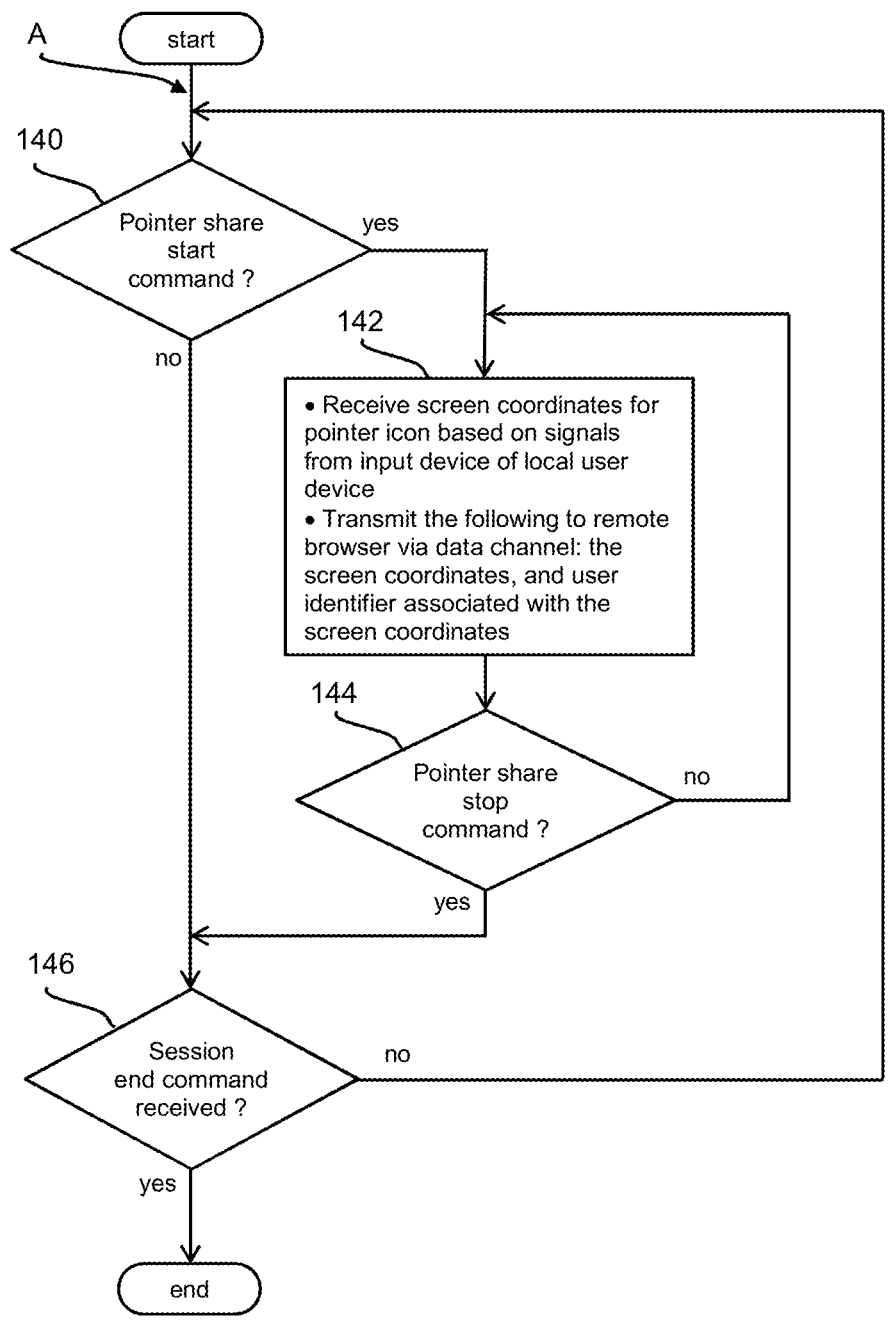
FIG. 17 is a process diagram of pointer share activity.

FIG. 17 shows an example process for pointer sharing. At block 140, the local browser monitors whether a pointer share start command has been generated. If no, the process proceeds to block 146. If yes, the process proceeds to block 142 where the local browser displays the pointer icon on the local conference webpage, receives screen coordinates for the pointer icon based on signals from the user input device. Next, the local browser transmits the following via the data channel to the remote browser: the screen coordinates for the pointer icon, and optionally the user identifier associated with the screen coordinates. As previously discussed, the user identifier may include any of a snapshot image of the local user and a name of the local user. When multiple pointer icons are on display, the user identifier ensures that the remote browser moves the correct pointer icon associated with the received screen coordinates. After block 142, the process proceeds to block 144.

At block 144, the local browser monitors whether a pointer share stop command has been generated. If no, the process returns to block 142. If yes, the process proceeds to block 146.

At block 146, the local browser determines whether a conference session end command has been generated. If yes, the process ends. If no, the process loops back to entry point A. Alternatively, the process may proceed to entry point A of any of the other processes described herein.

A multimedia conferencing method may comprise the local user device (or local browser running on the local user device) receiving a series of screen coordinates of a pointer icon via the data channel, and performing a pointer share activity defined by a sequence of movements of the pointer icon within the local conference webpage. Each movement in the sequence of movements is performed according to a corresponding one of the screen coordinates received from the remote user device and a time stamp for the corresponding one of the screen coordinates (see arrow 9 in FIG. 19). The pointer share activity will be saved by the local browser in a session log (also referred to as a log file in FIG. 19) if the local user had pressed session record button 84 previously described. The session replay data, which was saved by the local browser in the session log and transmitted to computer server 12 (or 13), will include the series of screen coordinates that was received and the time stamps for the screen coordinates. When the recorded session is replayed, the local browser will perform a repeat of the pointer share activity based on the session log fetched from the computer server (see arrow 6 in FIG. 20).

In some aspects, the time stamps for the screen coordinates are interspersed in time among the remote file object time stamps such that the repeat of the pointer share activity is performed concurrently with the repeat of the series of remote object handling cycles. For example, some of the time stamps for the screen coordinates could be 13:01, 13:02, and 13:04 while the remote file object time stamps for Slide1.jpg and Slide2.jpg could 12:50 and 13:05, respectively, such that the repeat for the pointer share activity is performed concurrently with the repeat for the remote object handling cycles for Slide1.jpg and Slide2.jpg. Here, the term "concurrently" means that at least a portion of the repeated pointer share activity is performed (in terms of timing) between two of the remote object handling cycles.

In the above descriptions, the session log is transmitted to and fetched from computer server 12 (or 13).

Alternatively, the session log is not transmitted to and not fetched from the computer server 12 (or 13). The session log is stored on and fetched from the local user device.

Figure 18:
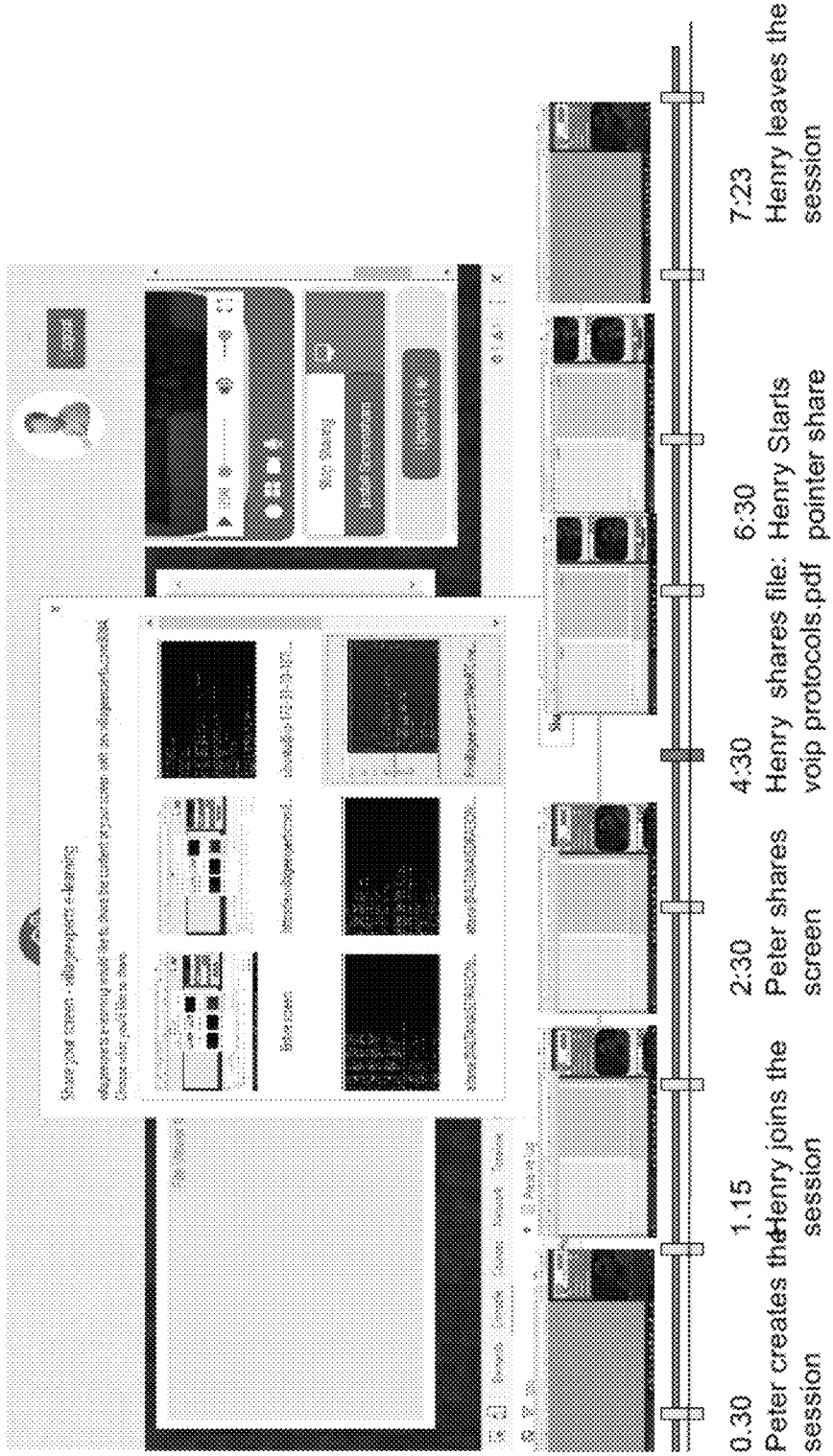
FIG. 18 shows a schematic timeline of example session replay activity according to FIG. 14.

FIG. 18 shows a schematic timeline of example session replay activity. There is toggleable timeline below a replaying session which shows the thumbnails, earlier recorded while a screen is playing back with individually recorded multimedia objects. The timeline progresses as the timer increases from the start time. At any point of time on timeline the browser will simulate the shared activity which happened at that instant with the help of the session log file and copies of shared resources. This feature lets the user have direct control of all elements present on the screen as opposed to a recorded video playing back. The user can interact with the recorded elements. For example, the user may copy visible text, view the replaying audio and video streams, and download the file share.

Figure 19:
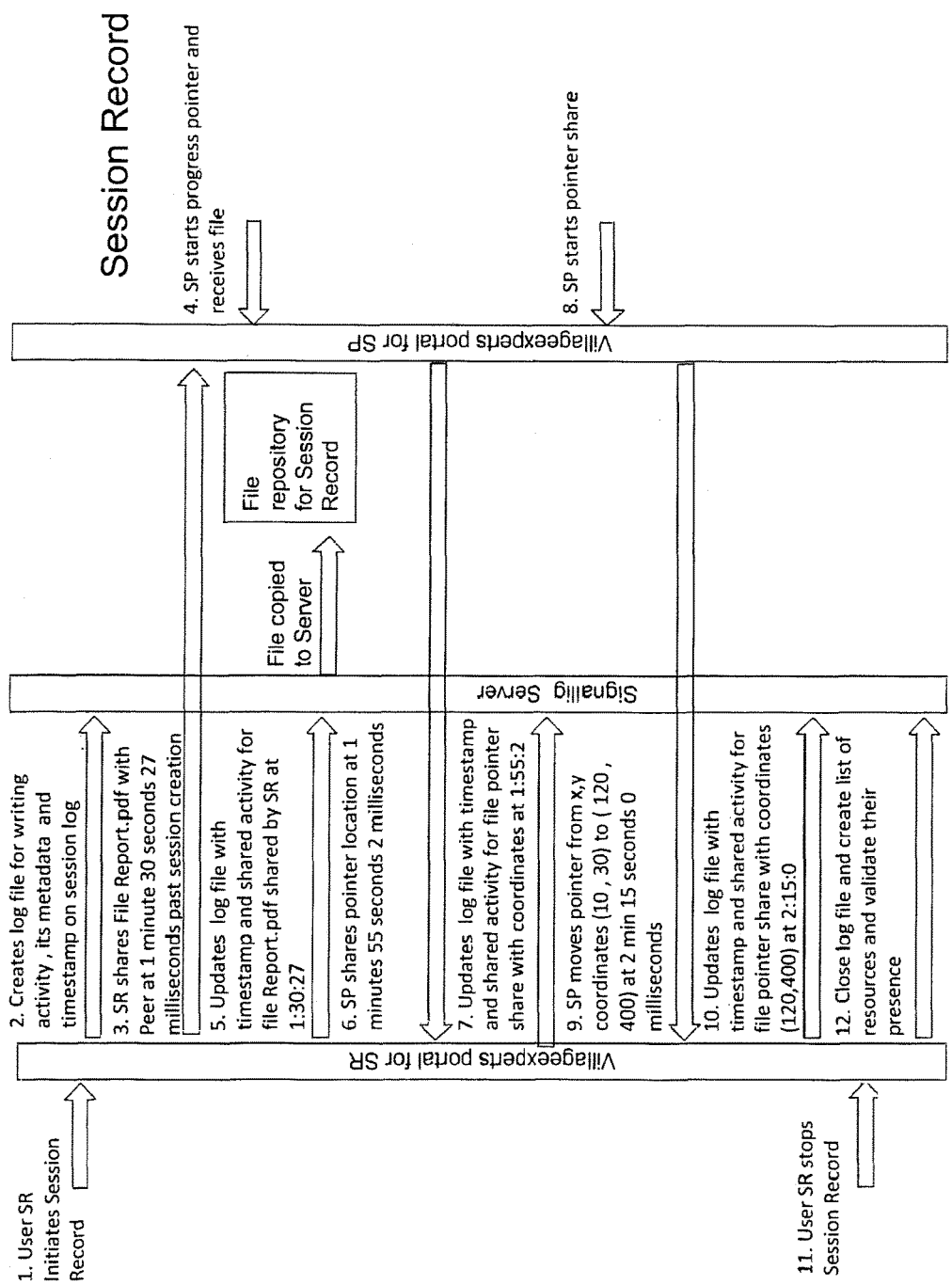
FIG. 19 is another process diagram of the session record activity of FIG. 13.
Figure 20:
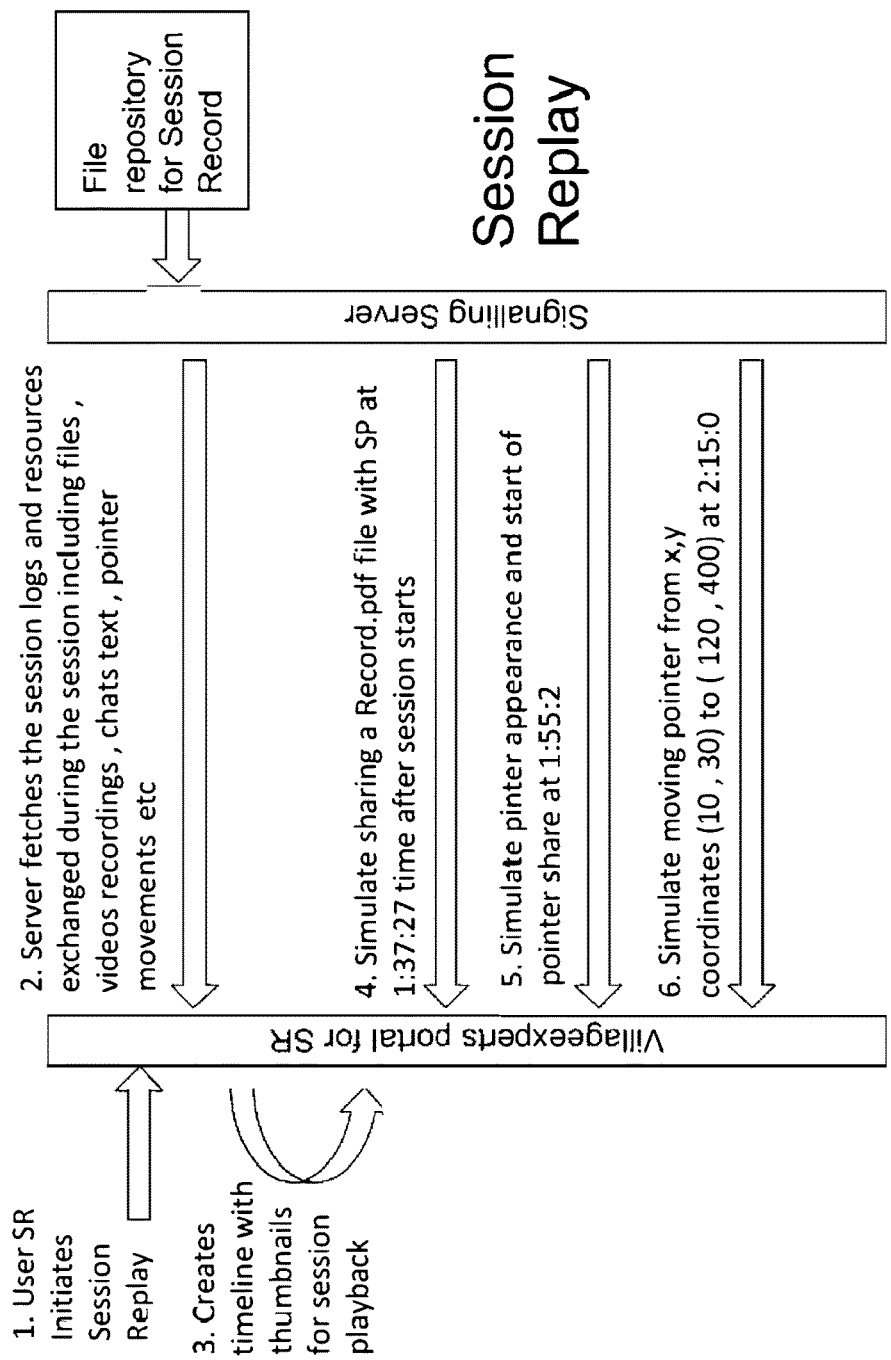
FIG. 20 is another process diagram of the session replay activity of FIG. 14.

FIG. 19 shows an example implementation of session record in the service requester/provider context of FIG. 4. FIG. 20 shows an example implementation of session replay in the service requester/provider context of FIG. 19.

Figure 21:
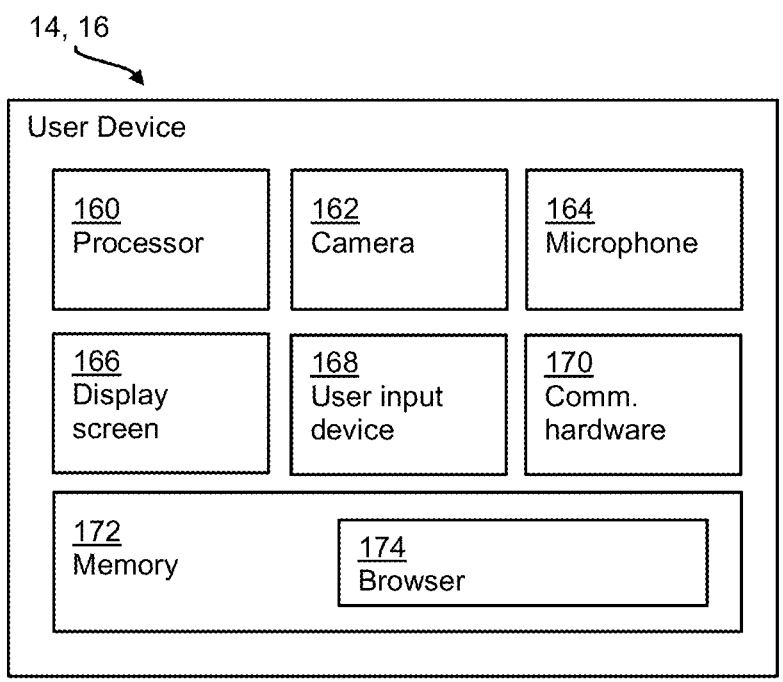
FIG. 21 is a schematic block diagram of an example user device.

FIG. 21 shows an example user device 14, 16 for performing the processes described herein. The user device includes hardware processor 160 configured to execute operations described above for browser 174. The hardware processor includes electronic circuitry, including any combination of microprocessors, application-specific integrated circuits, field-programmable gate arrays, as non-limiting examples. The user device further includes camera 162, microphone 164, display screen 166, user input device 168, communication hardware 170, and memory 172.

The camera and microphone are used to transmit a video of the user to other users in the conference session. The camera may include a charge-coupled device (CCD) sensor or a complementary metal-oxide semiconductor (CMOS) sensor, as non-limiting examples. The microphone can be a condenser or piezoelectric microphone, as non-limiting examples. The display screen (such as a liquid crystal display screen or organic light-emitting diode display, as non-limiting examples) allows the user to view the conference webpage displayed by the browser.

The input device (such as a keyboard, mouse, or touch-sensitive screen, as non-limiting examples) allows the user to interact with the conference webpage to perform the sharing activities described above. The communication hardware (such as a Wi-Fi transmitter and receiver, radio transmitter and receiver, and network interface hardware, as non-limiting examples) enables the user device to communicate through a communication network with other user devices.

The memory includes any one or a combination of random-access memory (RAM) modules, read-only memory (ROM) modules, and other electronic devices. The memory encompasses cache and main memory of hardware processor 160. The memory encompasses a mass storage device such as optical drives, magnetic drives, solid-state flash drives, as non-limiting examples. The memory stores browser 174 and encompasses the browser cache used by browser 174 to temporarily store media objects and other data described above. The memory may embody a non-transitory computer readable medium that stores instructions which when executed cause the hardware processor to perform any one or a combination of the processes described herein.

In another aspect, a multimedia conferencing method allows one of the users (such as a parent) to listen in or monitor activity between at least two other users (such as a student and a tutor). Such a method may comprise establishing peer connections between a local browser running on a local user device and at least two remote browsers running on remote user devices, wherein at least one of the remote browsers (the parent's browser) is a viewer for other users on a conference webpage. The other users (student and tutor) can be referred to as active users, and parent is a passive user. The viewer only receives a video stream of the other users without sharing a media stream or file object on the conference webpage. The viewer is able to monitor all the ongoing activities on the conference webpage such as view the other user's media stream and file objects in their respective or unified object tracking and viewing window. The viewer may receive a duplicate copy of a copy exchanged between the active users for a pointer being displayed, sync maximize and minimize signal being received, screen's media stream being shared by any other user, and any additional activity which occurs between the active users on the conference webpage. Thus, the method may further comprise monitoring, by the viewer, all ongoing activities on the conference webpage. The monitoring includes viewing the other user's media stream and file objects in one or more object viewing windows, and/or receiving a duplicate copy of a copy exchanged between the active users for a pointer being displayed, a sync maximize signal being receive, a sync minimize signal being received, and a media stream of a screen being shared by any of the other users.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A multimedia conferencing method comprising:
   establishing a peer connection and a data channel between a local browser running on a local user device and a remote browser running on a remote user device, the local user device including a display screen showing a conference webpage according to the local browser, the conference webpage including and simultaneously displaying a local object viewing window, a local object tracking window, a remote object viewing window, and a remote object tracking window; followed by
   performing a series of remote object handling cycles, each remote object handling cycle including:
      receiving a remote file object via the data channel from the remote user device to the local user device,
      displaying contents of the remote file object within the remote object viewing window by replacing contents of a prior-received remote file object displayed in the remote object viewing window, and
      adding a name of the remote file object in time sequential order to a cumulative list, which includes a name of the prior-received remote file object, displayed within the remote object tracking window; and
   performing a series of local object handling cycles, each local object handling cycle including:
      sending a local file object via the data channel from the local user device to the remote user device, the sending performed in response to user input on the conference webpage shown on the display screen of the local user device,
      displaying contents of the local file object within the local object viewing window by replacing contents of a prior-sent local file object displayed in the local object viewing window, and
      adding a name of the local file object in time sequential order to a cumulative list, which includes a name of the prior-sent local file object, displayed within the local object tracking window.

2. The method of claim 1, wherein:
   each remote object handling cycle further includes generating a remote file object time stamp that places the remote file object in time sequential order relative to the other the remote file objects,
   each local object handling cycle further includes generating a local file object time stamp that places the local file object in time sequential order relative to the other the local file objects,
   the remote file object time stamps are interspersed in time among the local file object time stamps such that the remote object handling cycles are performed concurrently with the local object handling cycles.

3. The method of claim 1, further comprising:
   after performing the series of local object handling cycles, replacing contents of local object file displayed in the local object viewing window with contents of one of the local object files named in the cumulative list displayed in the local object tracking window, the replacing performed in response to user input on the conference webpage shown on the display screen of the local user device.

4. The method of claim 1, further comprising:
   after performing the series of remote object handling cycles, creating an electronic copy, in a designated location in the local user device, of one of the remote object files named in the cumulative list displayed in the remote object tracking window, the creating of the electronic copy performed in response to user input on the conference webpage shown on the display screen of the local user device.

5. The method of claim 1, further comprising:
after performing the series of local object handling cycles, deleting one of the names from the cumulative list displayed in the local object tracking window, the deleting performed in response to user input on the conference webpage shown on the display screen of the local user device.

6. The method of claim 1, further comprising:
storing a snapshot image of at least a part of the conference webpage in a cache memory of the local browser running on the local user device, the storing performed in response to a snapshot command generated by user input on the conference webpage shown on the display screen of the local user device, and
adding a name of the snapshot image to the cumulative list displayed within the local object tracking window, wherein the name of the snapshot image is placed among the names of the local file objects in time sequential order.

7. The method of claim 1, further comprising:
storing a video recording of at least a part of the conference webpage in a cache memory of the local browser running on the local user device, the storing performed in response to a video record command generated by user input on the conference webpage shown on the display screen of the local user device, and
adding a name of the video recording to the cumulative list displayed within the local object tracking window, wherein the name of the video recording is placed among the names of the local file objects in time sequential order.

8. The method of claim 1, further comprising:
repeatedly revising a media object list stored in a cache memory of the local browser, the revising performed individually for each of the remote object handling cycles and each of the local object handling cycles, the media object list identifying the remote file objects, a remote file object time stamp for each of the remote file objects indicating a time when the remote file object was received from the remote user device, the local file objects, and a local file object time stamp for each of the local file objects indicating a time when the local file object was sent to the remote user device;
establishing a new peer connection and new data channel between the local browser running on the local user device and the remote browser running on the remote user device, the establishing performed in response to a determination by the local browser that a loss of the peer connection has occurred;
performing a local-to-remote synchronization process including transmitting data via the new peer connection from the local user device to the remote user device, the data specified by the media object list,
wherein the data, as specified by the media object list, includes the remote file objects, the name of each of the remote file objects, and the remote object time stamp of each of the remote file objects that places the remote file object in time sequential order relative to the other the remote file objects,
wherein the data, as specified by the media object list, further includes the local file objects, the name of each of the local file objects, and the local object time stamp of each of the local file objects that places the local file object in time sequential order relative to the other the local file objects.

9. The method of claim 1, further comprising:
creating a session log stored in the local user device;
saving, into the session log, session replay data including reference URLs for the remote file objects, a remote file object time stamp for each of remote file objects indicating a time when the remote file object was received from the remote user device, the local file objects, and a local file object time stamp for each of the local file objects indicating a time when the local file object was sent to the remote user device; followed by
fetching the session log from the local user device;
performing a repeat of the displaying and adding actions of the series of remote object handling cycles based on the session log fetched from the local user device, wherein the displaying and adding actions of each of the remote object handling cycles are performed according to corresponding remote file object time stamps; and
performing a repeat of the displaying and adding actions of the series of local object handling cycles based on the session log fetched from the local user device, wherein the displaying and adding actions of each of the local object handling cycles are performed according to corresponding local file object time stamps.

10. The method of claim 9, wherein the repeat of the series of remote object handling cycles is performed without receiving the remote file objects from the remote user device, and the wherein the repeat of the local object handling cycles is performed without sending the local file objects to the remote user device.

11. The method of claim 9, wherein the remote file object time stamps are interspersed in time among the local file object time stamps such that the repeat of the series of remote object handling cycles is performed concurrently with the repeat of the series of local object handling cycles.

12. The method of claim 9, further comprising:
receiving a sync maximize or minimize signal via the data channel from the remote user device; and
enlarging or reducing the remote object viewing window of the conference webpage shown on the display screen of the local user device, the enlarging or reducing performed in response to the received sync maximize or minimize signal,
wherein the session replay data, which was saved in the session log, includes a time stamp for the sync maximize or minimize signal indicating a time when the sync maximize or minimize signal was received,
and the method further comprises:
performing a repeat of the enlarging or reducing based on the session log fetched from a computer server, wherein the time stamp for the sync maximize or minimize signal is interposed in time among the time stamps for the remote file object time stamps such that the repeat of the enlarging or reducing is performed concurrently with the repeat of the series of remote object handling cycles.

13. The method of claim 9, further comprising:
receiving a sync remove signal via the peer connection from the remote user device; and
removing contents of a remote object from the remote object viewing window of the conference webpage shown on the display screen of the local user device, the removing performed in response to the received sync remove signal, wherein the session replay data, which was saved in the session log, includes a time stamp for the sync remove signal indicating a time when the sync remove signal was received, and the method further comprises:

performing a repeat of the removing based on the session log fetched from the computer server, wherein the time stamp for the sync remove signal is interposed in time among the time stamps for the remote file object time stamps such that the repeat of the removing is performed.

14. The method of claim 9, further comprising:

receiving a series of screen coordinates of a pointer icon via the data channel from the remote user device; and performing a pointer share activity defined by a sequence of movements of the pointer icon within the conference webpage shown on the display screen of the local user device, wherein each movement in the sequence of movements is performed according to a corresponding one of the screen coordinates received from the remote user device and a time stamp for the corresponding one of the screen coordinates, wherein the session replay data, which was saved in the session log and stored on at least a memory of the local user device, includes the series of screen coordinates received from the remote user device and the time stamp for each one of the screen coordinates, and the method further comprises:

performing a repeat of the pointer share activity based on the session log fetched from the memory of the local user device, wherein each movement in the sequence of movements is performed according to a corresponding one of the screen coordinates in the fetched session log and the time stamp for the corresponding one of the screen coordinates.

15. The method of claim 14, wherein the time stamps for the screen coordinates are interspersed in time among the remote file object time stamps such that the repeat of the pointer share activity is performed concurrently with the repeat of the series of remote object handling cycles.

16. The method of claim 9, further comprising:

while maintaining the peer connection, establishing a parallel peer connection between the local browser running on the local user device and the remote browser running on the remote user device;

receiving a video stream of screen share media from the remote user device via the parallel peer connection;

performing a remote screen share activity by displaying video stream within the conference webpage shown on the display screen of the local user device, wherein the session replay data, which was saved in the session log and saved on local user device memory, includes the video stream and a time stamp associated with the screen share activity, and the method further comprises:

performing a repeat of the remote screen share activity based on the session log fetched from the memory of the local user device.

17. The method of claim 16, wherein the time stamp time stamp associated with the screen share activity is interposed in time among the time stamps for the remote file object time stamps such that the repeat of the remote screen share activity is performed concurrently with the repeat of the series of remote object handling cycles.

18. The method of claim 1, further comprising:

receiving, via the data channel from the remote user device, pointer share data including a series of screen coordinates of a first pointer icon and a first user image of a person at the remote user device; and performing a first pointer share activity defined by a first sequence of movements of the first pointer icon within the conference webpage shown on the display screen of the local user device, wherein the first user image is displayed adjacent to the first pointer icon on the display screen, and each movement in the first sequence of movements is performed according to a corresponding one of the screen coordinates received from the remote user device and a time stamp for the corresponding one of the screen coordinates received from the remote user device.

19. The method of claim 18, further comprising receiving, via the data channel from the second remote user device, pointer share data including a series of screen coordinates of a second pointer icon and a second user image of a person at the second remote user device; and performing a second pointer share activity defined by a second sequence of movements of the second pointer icon within the conference webpage shown on the display screen of the local user device, wherein the second user image is displayed adjacent to the second pointer icon on the display screen, and each movement in the second sequence of movements is performed according to a corresponding one of the screen coordinates received from the second remote user device and a time stamp for the corresponding one of the screen coordinates received from the second remote user device, wherein the time stamps for the screen coordinates received from the remote user device are interspersed in time among the time stamps for the screen coordinates received from the second remote user such that the first pointer share activity is performed concurrently with the second pointer share activity.

20. The method of claim 1, further comprising:

creating a video stream of the display screen of the local user device, the creating performed in response to a screen share start command generated by user input on the conference webpage shown on the display screen of the local user device; and while maintaining the peer connection, establishing a parallel peer connection between the local browser running on the local user device and the remote browser running on the remote user device; and transmitting the video stream to the remote user device via the parallel peer connection.

* * * * *